US008423243B2

(12) United States Patent
Harima

(10) Patent No.: US 8,423,243 B2
(45) Date of Patent: Apr. 16, 2013

(54) VIBRATION-DAMPING CONTROLLING APPARATUS

(75) Inventor: Kenji Harima, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/122,641

(22) PCT Filed: Sep. 30, 2009

(86) PCT No.: PCT/JP2009/005042
§ 371 (c)(1), (2), (4) Date: Apr. 5, 2011

(87) PCT Pub. No.: WO2011/039807
PCT Pub. Date: Apr. 7, 2011

(65) Prior Publication Data

US 2012/0179332 A1 Jul. 12, 2012

(51) Int. Cl.

| | |
|---|---|
| ***B60G 17/018*** | (2006.01) |
| ***B62C 3/00*** | (2006.01) |
| ***B62K 25/00*** | (2006.01) |
| ***B60R 22/00*** | (2006.01) |
| ***E05F 15/00*** | (2006.01) |

(52) U.S. Cl.
USPC ................................................ 701/37; 701/48

(58) Field of Classification Search .................... 701/37; 180/337; 280/5.5
See application file for complete search history.

(56) References Cited

U.S. PATENT DOCUMENTS

| | | | | |
|---|---|---|---|---|
| 5,361,213 | A * | 11/1994 | Fujieda et al. | 701/111 |
| 6,418,363 | B2 * | 7/2002 | Cochofel et al. | 701/37 |
| 6,463,371 | B1 * | 10/2002 | Ulyanov et al. | 701/40 |
| 7,305,977 | B1 * | 12/2007 | Stroh et al. | 123/679 |
| 8,082,081 | B2 * | 12/2011 | Matsumoto et al. | 701/48 |
| 2001/0011455 | A1 * | 8/2001 | Harima et al. | 60/288 |
| 2006/0180372 | A1 * | 8/2006 | Mercier et al. | 180/210 |
| 2007/0208484 | A1 * | 9/2007 | Tsujimura et al. | 701/93 |

(Continued)

FOREIGN PATENT DOCUMENTS

| | | |
|---|---|---|
| JP | A-2004-168148 | 6/2004 |
| JP | A-2006-069472 | 3/2006 |

(Continued)

OTHER PUBLICATIONS

International Search Report issued in International Patent Application No. PCT/JP2009/005042 dated Dec. 1, 2009.

(Continued)

*Primary Examiner* — Thomas Black
*Assistant Examiner* — Tyler Paige
(74) *Attorney, Agent, or Firm* — Oliff & Berridge, PLC

(57) ABSTRACT

In a vibration-damping controlling apparatus for performing vibration-damping control which is control to suppress sprung vibration occurring in a vehicle by controlling torque generated in a wheel of the vehicle, the vibration-damping control is inhibited by making magnitude of vibration-damping torque as a torque for vibration damping capable of suppressing the sprung vibration different from the magnitude of the vibration-damping torque when learning of an air-fuel ratio is not performed, during the learning of the air-fuel ratio at the time of operation of an engine as a power source of the vehicle. According to this, it becomes possible to inhibit the vibration-damping control and control of learning correction of the air-fuel ratio from interfering with each other.

4 Claims, 12 Drawing Sheets

U.S. PATENT DOCUMENTS

2008/0078593 A1* 4/2008 Ortmann et al. ............ 180/65.2
2008/0111324 A1* 5/2008 Davis ............................ 280/5.5
2011/0010070 A1* 1/2011 Bohr et al. .................... 701/102
2011/0047980 A1* 3/2011 Santoso et al. ................. 60/285

FOREIGN PATENT DOCUMENTS

JP A-2008-100605 5/2008
JP A-2008-213556 9/2008
JP A-2008-223584 9/2008
JP A-2008-231989 10/2008
JP A-2008-232036 10/2008
JP A-2008-248757 10/2008
JP A-2009-018606 1/2009
JP A-2009-040163 2/2009
JP A-2009-108828 5/2009
JP A-2009-108829 5/2009
JP A-2009-108830 5/2009
JP A-2009-113515 5/2009
JP A-2009-113516 5/2009
JP A-2009-113517 5/2009
JP A-2009-114862 5/2009
JP A-2009-121426 6/2009
JP A-2009-121427 6/2009
JP A-2010-106817 5/2010

OTHER PUBLICATIONS

International Preliminary Report on Patentability issued in International Patent Application No. PCT/JP2009/005042 dated May 8, 2012.

Office Action issued in Japanese Patent Application No. 2010-537610 dated May 17, 2012 (with partial translation).

* cited by examiner

VIBRATION-DAMPING CONTROLLING APPARATUS

FIELD

The present invention relates to a vibration-damping controlling apparatus. The present invention especially relates to the vibration-damping controlling apparatus for suppressing vibration on a vehicle body side from a suspension device of a vehicle.

BACKGROUND

During travel of a vehicle, there is a case in which an attitude of the vehicle changes due to occurrence of so-called sprung vibration, which is the vibration on the vehicle body side from a suspension of the vehicle, by drive operation by a driver and disturbance during the travel of the vehicle. Therefore, there is a conventional vehicle, which reduces the sprung vibration. For example, in a vehicle stabilization control system disclosed in the Patent Literature 1, pitching vibration corresponding to current driving force is obtained based on a state equation and the like of a vehicle body sprung vibration model to obtain a correction value capable of rapidly suppressing the pitching vibration thus obtained. Further, by correcting requested engine torque based on the correction value, the pitching vibration, which is a kind of the sprung vibration, is suppressed. According to this, the change in the attitude of the vehicle can be suppressed, and behavior of the vehicle during the travel can be stabilized.

CITATION LIST

Patent Literature

Patent Literature 1: Japanese Patent Application Laid-open No. 2006-69472

SUMMARY

Technical Problem

Herein, in the conventional vehicle, the engine is often operated with an appropriate air-fuel ratio by detecting an actual air-fuel ratio at the time of the operation of the engine and performing learning correction of the air-fuel ratio based on the detected air-fuel ratio in order to obtain an appropriate operational state during the travel of the vehicle. Also, when performing control to suppress the sprung vibration such as the pitching vibration by the vibration-damping controlling apparatus as the vehicle stabilization control system disclosed in the Patent Literature 1, the torque generated by the engine is corrected according to the sprung vibration to suppress the sprung vibration, so that the air-fuel ratio easily changes. According to this, when performing the vibration-damping control, which is the control to suppress the sprung vibration, by using the engine, which performs the learning correction of the air-fuel ratio based on the detected actual air-fuel ratio, there is a case in which the learning correction of the air-fuel ratio becomes difficult and there is a case in which a desired air-fuel ratio is obtained with difficulty. In this case, property of the exhaust gas also is not the desired one, so that there is a case in which effective purification of the exhaust gas by the catalyst is difficult.

Also, when burning the fuel by the engine, although the exhaust gas discharged from the engine is purified by the catalyst provided on an exhaust passage to be emitted to an atmosphere, the catalyst is deteriorated as this purifies the exhaust gas. In this manner, the catalyst, which is deteriorated as this purifies the exhaust gas, has large ability to purify the exhaust gas when this is not deteriorated, however, the ability to purify the exhaust gas decreases when this is deteriorated.

On the other hand, although the air-fuel ratio easily changes as described above when the vibration-damping control is executed, when the air-fuel ratio changes, the property of the exhaust gas flowing in the catalyst also changes. In this case, since the ability to purify the exhaust gas is large when the catalyst is not deteriorated, the exhaust gas can be purified even when the air-fuel ratio largely changes, however, since the ability to purify the exhaust gas decreases when the catalyst is deteriorated, the purification becomes difficult depending on the property of the exhaust gas when the air-fuel ratio largely changes by the vibration-damping control. Therefore, when performing the vibration-damping control, there is a case in which the effective purification of the exhaust gas at the time of the vibration-damping control becomes difficult depending on the state of the catalyst.

In this manner, although the sprung vibration is suppressed by correcting the torque generated by the engine in the vibration-damping control, since the air-fuel ratio is changed when correcting the torque, there is a case in which the effective purification of the exhaust gas by the catalyst is difficult due to the same.

The present invention is achieved in view of the above description, and an object thereof is to provide the vibration-damping controlling apparatus capable of achieving a good balance between the vibration-damping control and emission performance.

Solution to Problem

In order to solve the above mentioned problem and achieve the object, in a vibration-damping controlling apparatus according to the present invention for suppressing sprung vibration occurring in a vehicle by controlling torque generated in a wheel of the vehicle, the vibration-damping controlling apparatus makes magnitude of vibration-damping torque as a torque for vibration damping capable of suppressing the sprung vibration different from the magnitude of the vibration-damping torque when learning of an air-fuel ratio is not performed, during the learning of the air-fuel ratio at the time of operation of an engine as a power source of the vehicle.

Further, in order to solve the above mentioned problem and achieve the object, in a vibration-damping controlling apparatus according to the present invention for suppressing sprung vibration occurring in a vehicle by controlling torque generated in a wheel of the vehicle, the vibration-damping controlling apparatus makes magnitude of vibration-damping torque as a torque for vibration damping capable of suppressing the sprung vibration different according to a state of deterioration of a catalyst for purifying exhaust gas discharged from an engine as a power source of the vehicle.

Further, it is desirable that the magnitude of the vibration-damping torque is made different according to a temperature of the catalyst.

Further, in order to solve the above mentioned problem and achieve the object, in a vibration-damping controlling apparatus according to the present invention for suppressing sprung vibration occurring in a vehicle by controlling torque generated in a wheel of the vehicle, the vibration-damping controlling apparatus makes magnitude of vibration-damping torque as a torque for vibration damping capable of suppressing the sprung vibration different according to whether deterioration of a catalyst for purifying exhaust gas discharged from an engine as a power source of the vehicle is being diagnosed.

Advantageous Effects of Invention

The vibration-damping controlling apparatus according to the present invention has an effect to achieve a good balance between the vibration-damping control and the emission performance.

DESCRIPTION OF EMBODIMENTS

An embodiment of a vibration-damping controlling apparatus according to the present invention is hereinafter described in detail with reference to the drawings. Meanwhile, the invention is not limited by the embodiment. Also, components in the following embodiment include a component easily replaced by one skilled in the art or a substantially identical component.

First Embodiment

Figure 1:
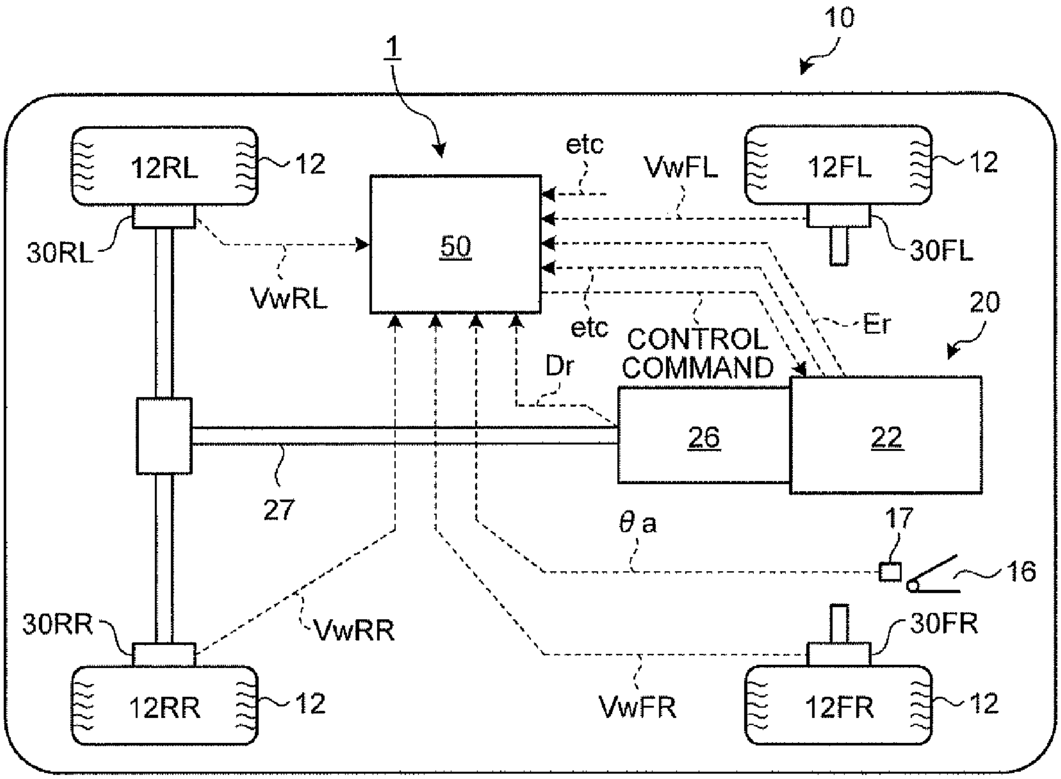
FIG. 1 is a schematic diagram of a vehicle on which a vibration-damping controlling apparatus according to a first embodiment of the present invention is loaded.

FIG. 1 is a schematic diagram of a vehicle on which the vibration-damping controlling apparatus according to a first embodiment of the present invention is loaded. It is hereinafter described supposing that a direction of movement at the time of general travel of a vehicle 10 is forward and a direction opposite to the direction of movement is backward. Also, sprung vibration in the following description is intended to mean vibration occurring in a vehicle body through a suspension by an input from a road surface to a wheel of the vehicle, for example, the vibration having a frequency component of 1 to 4 Hz, more specifically, approximately 1.5 Hz, and the sprung vibration of the vehicle includes a component in a pitch direction or in a bounce direction (vertical direction) of the vehicle. Also, sprung vibration damping is intended to mean suppression of the above-described sprung vibration of the vehicle.

The vehicle 10 illustrated in FIG. 1 is provided with a vibration-damping controlling apparatus 1 according to the first embodiment, and the vehicle 10 loaded with an engine 22, which is an internal-combustion engine, as a power source is capable of traveling by power of the engine 22. An automatic transmission 26 is connected to the engine 22 and the power generated by the engine 22 can be transmitted to the automatic transmission 26. Meanwhile, the engine 22, which is the internal-combustion engine, may be a reciprocating spark-ignition internal-combustion engine or a reciprocating compression-ignition internal-combustion engine. A case in which the engine 22 is a gasoline engine is hereinafter described as an example. Also, the transmission may be a manual transmission in which the driver manually shifts gears.

The power after gear shifting by the automatic transmission 26 is transmitted to right and left rear wheels 12RR and 12RL provided as driving wheels out of wheels 12 of the vehicle 10 as driving force through a power transmission pathway such as a propeller shaft 27, and according to this, the vehicle 10 is capable of traveling. In this manner, a device capable of transmitting the driving force to the rear wheels 12RL and 12RR, which are the driving wheels, such as the engine 22 and the automatic transmission 26 is provided as a drive device 20.

An accelerator pedal 16 operated by the driver and an accelerator pedal sensor 17, which is accelerator pedal depression amount detecting means, capable of detecting a requested value by accelerator operation by the driver, that is to say, an accelerator pedal depression amount θa being a depression amount of the accelerator pedal 16 are provided in the vicinity of a driver seat of the vehicle 10. The drive device 20 is configured to be able to generate the driving force corresponding to request of the driver by operating according to the accelerator pedal depression amount θa detected by the accelerator pedal sensor 17 and generating the power used when generating the driving force in the rear wheels 12RL and 12RR to transmit the power to the rear wheels 12RL and 12RR.

Out of the wheels 12 of the vehicle 10, while the rear wheels 12RL and 12RR are provided as the driving wheels, right and left front wheels 12FR and 12FL are provided as steering wheels capable of being steered by handle operation of the driver.

In this manner, although the vehicle 10 provided with the vibration-damping controlling apparatus 1 according to the first embodiment is a so-called rear-wheel-drive vehicle in which the power generated by the engine 22 is transmitted to the rear wheels 12RL and 12RR and the driving force is generated in the rear wheels 12RL and 12RR, the vehicle 10 may be a drive type other than the rear-wheel-drive type. The vehicle 10 may also be a front-wheel-drive vehicle, which generates the driving force in the front wheels 12FL and 12FR, or may also be a four-wheel-drive vehicle, which generates the driving force in both of the front wheels 12FL and 12FR and the rear wheels 12RL and 12RR, for example. Also, the steering wheels may be other than the front wheels 12FL and 12FR.

The drive device 20 provided in this manner is connected to an electronic control unit 50 loaded on the vehicle 10, and operation of the drive device 20 is controlled by the electronic control unit 50. The electronic control unit 50 is composed of known arithmetic processing unit and storage device. Signals indicating wheel speeds Vwi (i=FL, FR, RL and RR) from wheel speed sensors 30*i* (i=FL, FR, RL and RR) provided in the vicinity of each wheel 12 and signals such as a rotational speed Er of the engine 22 and a rotational speed Dr of the automatic transmission 26 from sensors provided on each part of the vehicle 10 and the accelerator pedal depression amount θa detected by the accelerator pedal sensor 17 are input to the electronic control unit 50. Meanwhile, in addition to the signals, various detection signals for obtaining various parameters (a cooling water temperature, an intake air temperature, an intake air pressure, an atmospheric pressure and an oil temperature) necessary for various pieces of control, which should be executed at the time of travel of the vehicle 10, are input to the electronic control unit 50.

Figure 2:
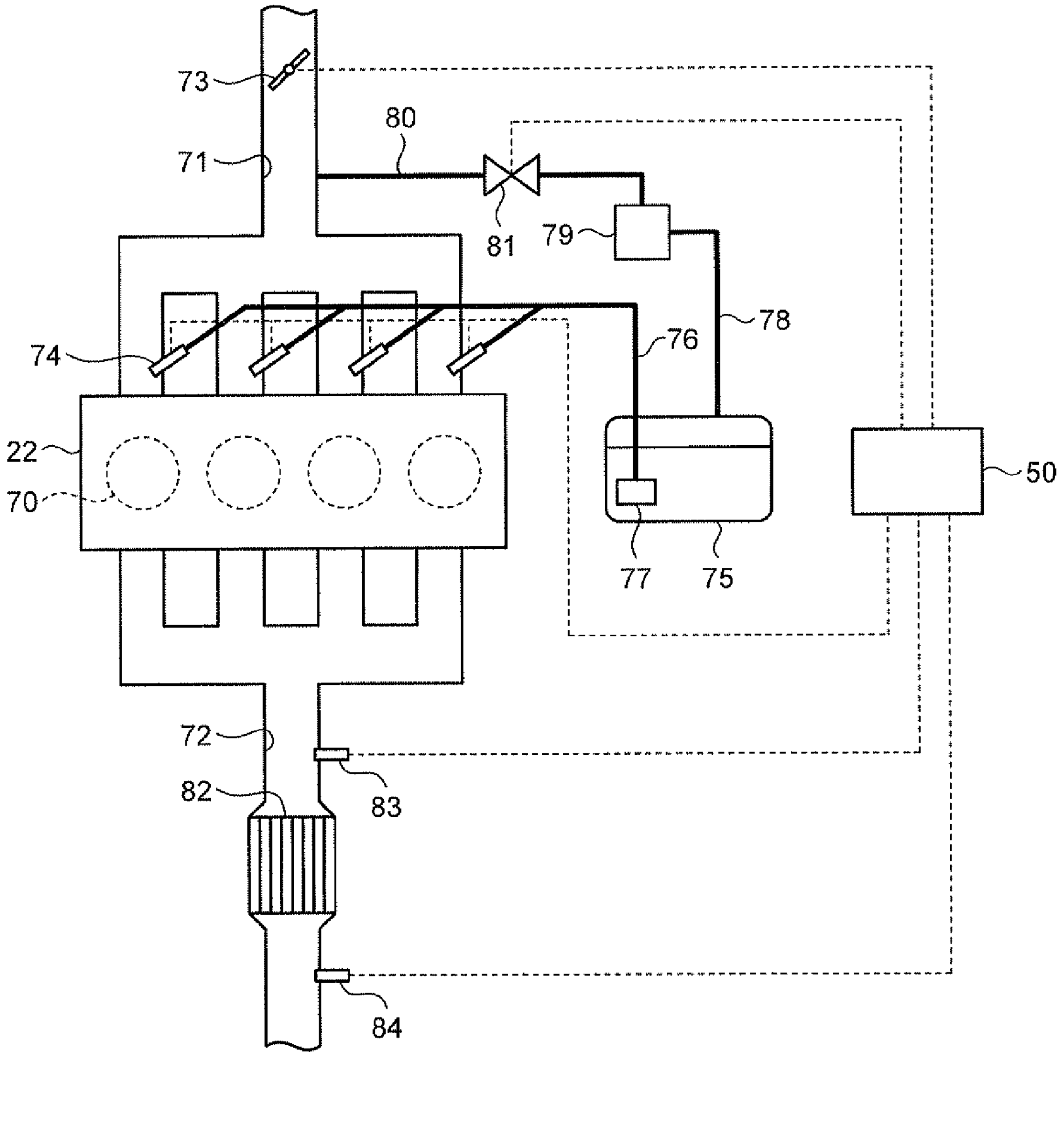
FIG. 2 is a detail view of an engine illustrated in FIG. 1.

FIG. 2 is a detail view of the engine illustrated in FIG. 1. The engine 22 is the internal-combustion engine capable of being operated by combustion of fuel in a combustion chamber 70, so that a intake passage 71, which is a passage of air when sucking the air for the combustion of the fuel, and an exhaust passage 72, which is a passage of exhaust gas discharged after the combustion of the fuel, are connected to the engine 22. Out of them, a throttle valve 73 for adjusting an intake air amount and a fuel injector 74 for injecting the fuel to be supplied to the combustion chamber 70 are provided on the intake passage 71.

Out of them, the fuel injector 74 is connected to a fuel tank 75 for reserving the fuel through a fuel supply passage 76 and a fuel pump 77 capable of supplying the fuel in the fuel tank 75 to the fuel injector 74 is provided on the fuel supply passage 76. Also, a vapor passage 78 through which vapor, which is evaporated fuel generated in the fuel tank 75, flows is connected to the fuel tank 75 and the other end of the vapor passage 78 is connected to a canister 79 for capturing and temporarily storing the vapor. Further, a purge passage 80 capable of introducing the vapor captured by the canister 79 to the intake passage 71 is connected to the canister 79. Also, an end opposite to the end connected to the canister 79 of the purge passage 80 is connected to a downstream side of the throttle valve 73 of the intake passage 71, and further, a purge control valve 81 capable of adjusting a purge amount, which is a flow amount of the vapor from the canister 79 to the intake passage 71, is provided on the purge passage 80. In this manner, the engine 22 is configured to be able to purge the vapor generated in the fuel tank 75 to the intake passage 71 as purge gas.

Also, a catalyst 82, which is purifying means for purifying the exhaust gas flowing through the exhaust passage 72, is provided on the exhaust passage 72. Further, an air-fuel ratio sensor 83, which is air-fuel ratio detecting means for detecting an air-fuel ratio of the exhaust gas flowing through the exhaust passage 72 in the exhaust gas, is provided on an upstream side of the catalyst 82 in the exhaust passage 72 and an $O_2$ sensor 84, which is oxygen concentration detecting means for detecting oxygen concentration of the exhaust gas flowing through the exhaust passage 72, is provided on a downstream side of the catalyst 82 in the exhaust passage 72. The throttle valve 73, the fuel injector 74, the air-fuel ratio sensor 83 and the $O_2$ sensor 84 are connected to the electronic control unit 50.

Figure 3:
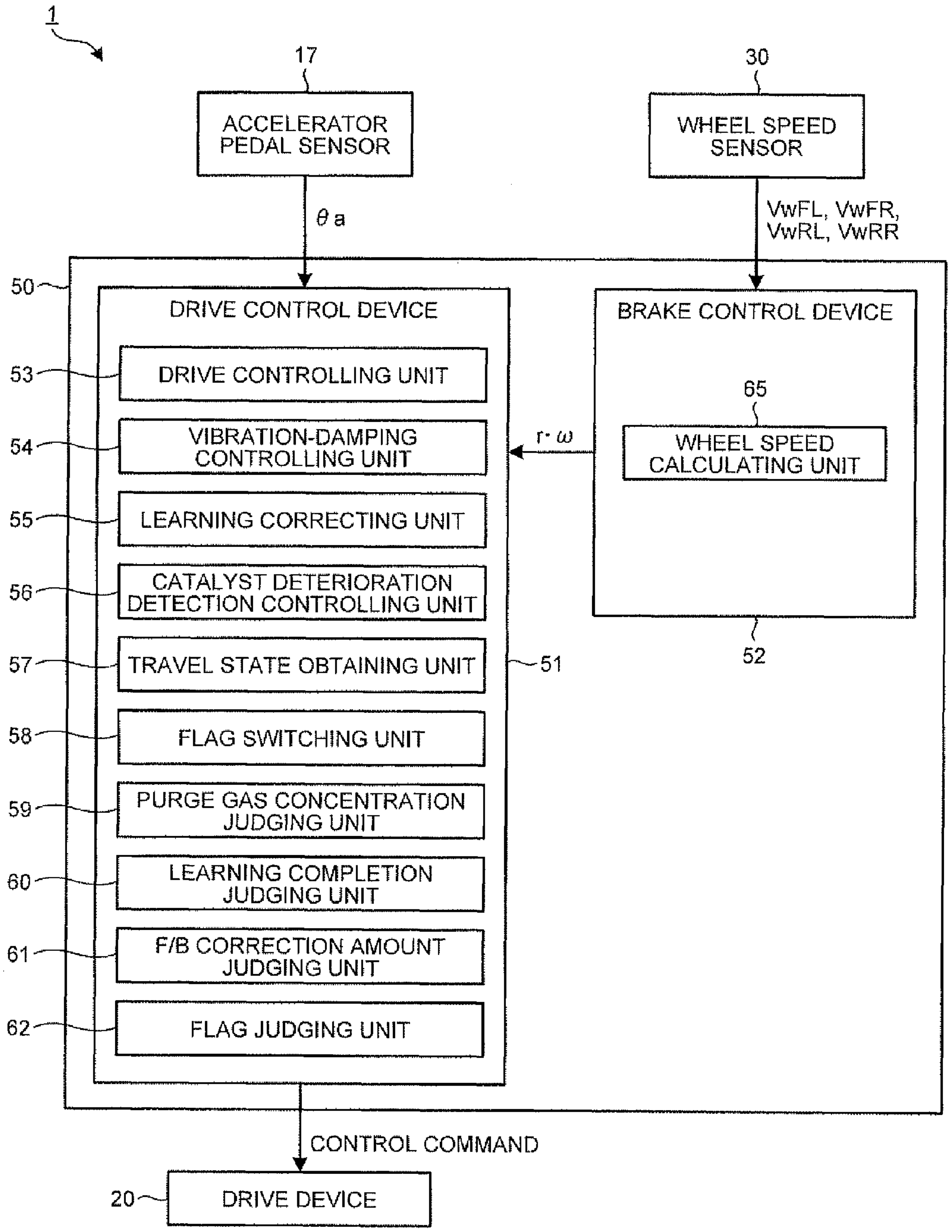
FIG. 3 is a schematic configuration diagram of an electronic control unit illustrated in FIG. 1.

FIG. 3 is a schematic configuration diagram of the electronic control unit illustrated in FIG. 1. The electronic control unit 50 has a drive control device 51 for controlling the operation of the drive device 20 and a brake control device 52 for controlling operation of a brake device (not illustrated) for generating braking force in each wheel 12, as illustrated in FIG. 3. Out of them, the drive control device 51 is provided with a drive controlling unit 53 for controlling the drive device 20 by determining a command when controlling the driving force generated by the drive device 20 based on a drive request of the driver and transmitting the command to the drive device 20, a vibration-damping controlling unit 54 for calculating a correction amount of driving torque for suppressing the sprung vibration when performing vibration-damping control, a learning correcting unit 55 for performing learning correction when adjusting the air-fuel ratio of mixture gas at the time of operation of the engine 22, a catalyst deterioration detection controlling unit 56 for performing catalyst deterioration detection control, which is control to estimate a deterioration state of the catalyst 82, a travel state obtaining unit 57 for obtaining travel state information of the vehicle 10, a flag switching unit 58 for switching a state of a vibration-damping control cut flag, which is a flag indicating whether to inhibit the vibration-damping control, a purge gas concentration judging unit 59 for judging whether purge gas concentration, which is a ratio of the purge gas in the mixture gas flowing in the combustion chamber 70, is less than predetermined concentration, a learning completion judging unit 60 for judging whether the learning correction of the air-fuel ratio is completed, a F/B correction amount judging unit 61 for judging whether a feedback correction amount, which is a correction amount at the time of the learning correction of the air-fuel ratio, is less than a predetermined correction amount, and a flag judging unit 62 for judging the state of the vibration-damping control cut flag. The brake control device 52 is provided with a wheel speed calculating unit 65 for calculating wheel speeds from detection values of wheel speed sensors 30FR, FL, RR and RL.

The vibration-damping controlling apparatus 1 according to the first embodiment is configured as described above, and an action thereof is hereinafter described. First, when the vibration-damping controlling apparatus 1 according to the first embodiment performs operation control of the engine 22, the drive control device 51 of the electronic control unit 50 allows each operation unit allowed to operate when adjusting an output of the engine 22 such as the throttle valve 73 and the fuel injector 74 to operate according to requested power for the engine 22. According to this, to the engine 22, air of an amount corresponding to an opening degree of the throttle valve 73 is sucked from the intake passage 71 and the fuel corresponding to the command from the drive control device 51 is supplied from the fuel injector 74 to which the fuel in the fuel tank 75 is supplied by the fuel pump 77.

In this manner, the mixture gas of the air of the amount corresponding to the opening degree of the throttle valve 73 and the fuel injected from the fuel injector 74 flows to the combustion chamber 70 of the engine 22, and by igniting the fuel by an ignition plug (not illustrated) provided on the combustion chamber 70, the mixture gas burns in the combustion chamber 70. The engine 22 generates the power by energy at the time of the combustion. The exhaust gas after the combustion of the mixture gas in the combustion chamber 70 flows to the exhaust passage 72. Since the catalyst 82 for purifying the exhaust gas is provided on the exhaust passage 72, the exhaust gas flowing to the exhaust passage 72 is purified by the catalyst 82 and is emitted to atmosphere after a sound volume of which is lowered by a silencer (not illustrated).

Although the vapor is easily generated in the fuel tank 75 because gasoline, which is the fuel, is highly volatile, the vapor generated in the fuel tank 75 flows to the canister 79 through the vapor passage 78 and is temporarily captured by the canister 79. By controlling the purge control valve 81 provided on the purge passage 80 by the drive control device 51, the vapor captured by the canister 79 flows to the intake passage 71 by a desired purge amount. The vapor flowing to the intake passage 71 in this manner burns in the combustion chamber 70 together with the fuel injected by the fuel injector 74.

The air-fuel ratio sensor 83 and the $O_2$ sensor 84 are provided on the exhaust passage 72 through which the exhaust gas flows, and the air-fuel ratio sensor 83 and the $O_2$ sensor 84 detect the air-fuel ratio of the exhaust gas flowing through the exhaust passage 72. The detection results are transmitted to the drive control device 51. In the drive control device 51, the learning correction of an injection amount of the fuel by the fuel injector 74 is performed by the learning correcting unit 55 of the drive control device 51 based on the detection results of the air-fuel ratio sensor 83 and the $O_2$ sensor 84.

In the learning correction, specifically, a target air-fuel ratio, which is a target of the air-fuel ratio when controlling the throttle valve 73 and the fuel injector 74 is compared with the detection results of the air-fuel ratio sensor 83 and the $O_2$ sensor 84 in a state in which the opening degree of the throttle valve 73 and the injection amount of the fuel from the fuel injector 74 are substantially constant, that is to say, in a state in which change in the power generated by the engine 22 is little. As a result of the comparison, when an actual air-fuel ratio detected by the air-fuel ratio sensor 83 and the $O_2$ sensor 84 loses touch with the target air-fuel ratio, the injection amount when injecting the fuel by the fuel injector 74 is corrected. According to this, the injection amount of the fuel is corrected such that the actual air-fuel ratio approaches the target air-fuel ratio in subsequent control.

Meanwhile, when the air-fuel ratio is adjusted, it is adjusted including the purge amount flowing from the purge passage 80 to the intake passage 71. That is to say, a ratio of the fuel in the mixture gas flowing to the combustion chamber 70 increases when the purge amount increases, and the ratio of the fuel in the mixture gas decreases when the purge amount decreases, so that, when adjusting the air-fuel ratio, it is adjusted including the purge amount adjustable by controlling the purge control valve 81. Therefore, when performing the learning correction of the air-fuel ratio, the purge amount adjusted by the purge control valve 81 also is corrected as necessary. By the control in this manner, the engine 22 can be operated in a desired state.

The vibration-damping controlling apparatus 1 according to the first embodiment performs the catalyst deterioration detection control for detecting the deterioration of the catalyst 82. When performing the catalyst deterioration detection control, a control signal is transmitted from the catalyst deterioration detection controlling unit 56 of the drive control device 51 to the drive controlling unit 53 so as to change the air-fuel ratio of the mixture gas at the time of the operation of the engine 22 from the air-fuel ratio suitable for a travel state of the vehicle 10 to an optional air-fuel ratio. The drive controlling unit 53, which receives the control signal, changes the air-fuel ratio by controlling the fuel injector 74 and the like. The catalyst deterioration detection controlling unit 56 estimates a deterioration state of the catalyst 82 from the detection results of the air-fuel ratio sensor 83 and the $O_2$ sensor 84 in a case in which the air-fuel ratio is changed in this manner to diagnose the deterioration state of the catalyst 82. When it is diagnosed that the catalyst 82 is deteriorated by the catalyst deterioration detection control, the control according to the state of the deterioration is performed when controlling the engine 22.

While the engine 22 controls in this manner, the vibration-damping controlling apparatus 1 according to the first embodiment is configured to be able to perform the vibration-damping control. Next, the vibration-damping control is described. Out of the drive control device 51 and the brake control device 52 provided on the electronic control unit 50, to the brake control device 52, pulse-type electric signals sequentially generated for each rotation of the wheel 12 by a predetermined amount from the wheel speed sensors 30FR, FL, RR and RL provided in the vicinity of each wheel 12 are input. A wheel speed calculating unit 65 of the brake control device 52 calculates each wheel rotational speed $\omega i$ (i=FL, FR, RL and RR) by measuring a time interval of arrival of the pulse signals sequentially input in this manner and calculates each wheel speed Vwi by multiplying the same by a wheel radius r. The brake control device 52 outputs an average value $r \cdot \omega$ of the wheel speeds VwFL, VwFR, VwRL and VwRR corresponding to each wheel 12FL, 12FR, 12RL and 12RR thus calculated, respectively, to the drive control device 51 in order to calculate a wheel torque estimated value by the drive control device 51 as described later. Meanwhile, the calculation from the wheel rotational speed to the wheel speed may be performed by the drive control device 51. In this case, the wheel rotational speed is transmitted from the brake control device 52 to the drive control device 51.

In the drive control device 51, the drive request of the driver is determined as target output torque of the drive device 20 requested by the driver (driver requested torque) based on the accelerator pedal depression amount $\theta a$ detected by the accelerator pedal sensor 17. The driver requested torque, which is the target output torque, is requested torque, which is the torque generated in the wheel 12 for realizing a desired travel state requested by the driver. Herein, in the drive control device 51, the driver requested torque is corrected in order to execute the vibration-damping control for suppressing pitch and bounce of a vehicle body 11 (refer to FIG. 4) by controlling the driving force, and a control command corresponding to the corrected requested torque is given to the drive device 20. The vibration-damping control is executed by controlling the driving torque generated in the wheel 12 by them.

In such vibration-damping control, (1) the wheel torque estimated value of the driving wheel by force acting in the driving wheel between the same and a road surface is calculated, (2) an sprung vibration state amount by a motion model of vehicle body vibration is calculated, and (3) a correction amount of the wheel torque for suppressing the sprung vibration state amount is calculated and the requested torque is corrected based on the same. The wheel torque estimated value in (1) is calculated based on a wheel speed value of the driving wheel (or the wheel rotational speed of the driving wheel) received from the brake control device 52.

Figure 4:
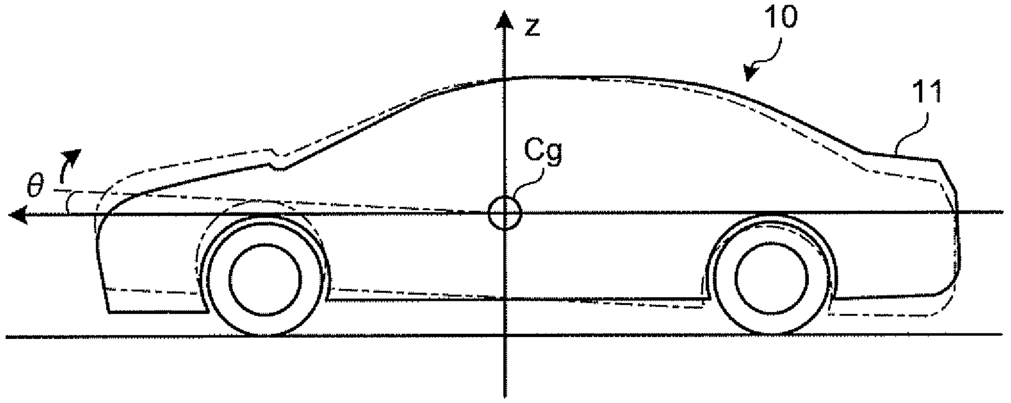
FIG. 4 is an illustrative diagram of a motion direction of a vehicle body.

FIG. 4 is an illustrative diagram of a motion direction of the vehicle body. Next, a configuration of driving force control to perform the vibration-damping control of the vehicle body 11 is described. When the drive device 20 operates based on the drive request of the driver and wheel torque variation occurs, bounce vibration, which is the vibration in a vertical direction (z direction) of a center of gravity Cg of the vehicle body 11, and pitch vibration, which is the vibration in a pitch direction ($\theta$ direction) around the center of gravity of the vehicle body

11, might occur in the vehicle body 11, as illustrated in FIG. 4. Also, when external force or torque (disturbance) acts on the wheel 12 from the road surface during the travel of the vehicle 10, the disturbance is transmitted to the vehicle 10 and the vibration in the bounce direction and in the pitch direction also might occur in the vehicle body 11 due to the transmitted disturbance.

Therefore, the vibration-damping controlling apparatus 1 according to the first embodiment builds the motion model of the sprung vibration such as the pitch and the bounce of the vehicle body 11, calculates displacements z and θ of the vehicle body 11 and change ratios thereof dz/dt and dθ/dt when inputting a value obtained by converting the driver requested torque, that is to say, the torque requested by the driver to the wheel torque and an estimated value of current wheel torque to the model, that is to say, state variables of the vehicle body vibration, and adjusts the driving torque, which is the torque generated in the wheel 12 of the drive device 20, such that the state variables obtained from the model converge to 0. In other words, the driver requested torque is corrected such that the sprung vibration is suppressed.

Figure 5:
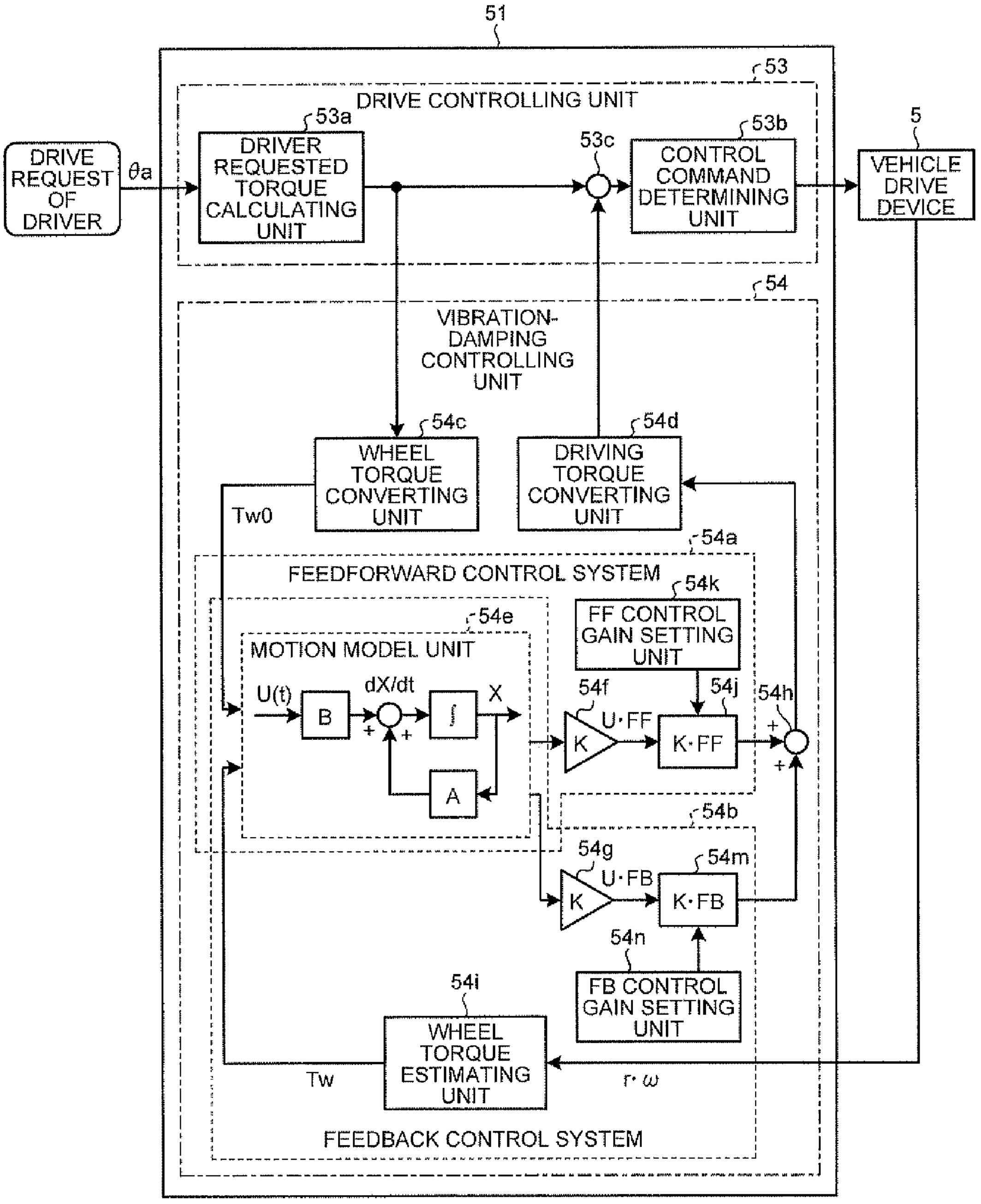
FIG. 5 is a block diagram illustrating a configuration of control in driving force control.

FIG. 5 is a block diagram illustrating a configuration of the control in the driving force control. When the vibration-damping controlling apparatus 1 according to the first embodiment performs the vibration-damping control, this is executed by performing various calculations by the electronic control unit 50, and the vibration-damping control is mainly performed by performing the calculation to convert the drive request of the driver to the driving force generated by the drive device 20 by the drive controlling unit 53 of the drive control device 51 and by performing the calculation to correct the drive request of the driver so as to suppress the sprung vibration of the vehicle body 11 by the vibration-damping controlling unit 54, as illustrated in FIG. 5.

In the drive controlling unit 53, a driver requested torque calculating unit 53*a* converts the accelerator pedal depression amount θa detected by the accelerator pedal sensor 17 as the drive request of the driver to the driver requested torque in a vehicle drive device 5, and a control command determining unit 53*b* converts the same to the control command to the vehicle drive device 5 to transmit to the vehicle drive device 5. Meanwhile, the vehicle drive device 5 herein includes not only the drive device 20 but also a device capable of detecting the wheel speed such as a wheel speed sensor 30 and the wheel speed calculating unit 65 of the brake control device 52 of the electronic control unit 50 and is configured to be able to feed back the travel state during the travel of the vehicle 10.

When controlling the driving force according to the drive request of the driver, as the vehicle 10 loaded with the vibration-damping controlling apparatus 1 according to the first embodiment, when the power source in the vehicle drive device 5 to be controlled in the vibration-damping control is the engine 22, in the drive controlling unit 53, the driver requested torque calculating unit 53*a* converts the drive request of the driver to the requested output torque of the engine 22 and the control command determining unit 53*b* converts the same to the control command to the engine 22 to transmit to the engine 22. The control command is appropriately set according to the configuration of the drive device 20 such that this becomes the control command suitable for the control of a diesel engine when the power source is the diesel engine.

On the other hand, the vibration-damping controlling unit 54 is configured to be able to set a vibration-damping control compensation amount, which is a compensation amount at the time of the vibration-damping control by feedback control based on at least each wheel speed Vwi (i=FL, FR, RL and RR) detected by the wheel speed sensors 30*i* (i=FL, FR, RL and RR). The vibration-damping controlling unit 54 is capable of setting the vibration-damping control compensation amount by using feedforward control based on the driver requested torque for the vehicle drive device 5 together with the feedback control based on the wheel speed. Therefore, the vibration-damping controlling unit 54 is provided with a feedforward control system 54*a* and a feedback control system 54*b*. Also, the vibration-damping controlling unit 54 is provided with a wheel torque converting unit 54*c* for converting the driver requested torque calculated by the driver requested torque calculating unit 53*a* to driver requested wheel torque Tw0, which is the torque generated in the driving wheel, and a driving torque converting unit 54*d* for converting a correction amount of the driver requested wheel torque Tw0 to a unit of the driving torque of the vehicle drive device 5.

The feedforward control system 54*a* provided on the vibration-damping controlling unit 54 has a so-called optimal regulator configuration and is provided with a motion model unit 54*e* of the sprung vibration of the vehicle body 11 and a FF secondary regulator unit 54*f*. In the feedforward control system 54*a*, the driver requested wheel torque Tw0 converted by the wheel torque converting unit 54*c* is input to the motion model unit 54*e*. The motion model unit 54*e* calculates response of the state variable of the vehicle 10 to the input torque to input to the FF secondary regulator unit 54*f*. The FF secondary regulator unit 54*f* calculates a FF system vibration-damping torque compensation amount U·FF, which is the correction amount of the driver requested wheel torque Tw0, for converging the state variable calculated by the motion model unit 54*e* to a minimum value based on a predetermined gain K to be described later. The FF system vibration-damping torque compensation amount U·FF is a feedforward control amount (FF control amount) of the driving torque in the feedforward control system 54*a* based on the driver requested torque for the vehicle 10, that is to say, the vibration-damping control compensation amount in the feedforward control.

The feedback control system 54*b* also has the so-called optimal regulator configuration. The feedback control system 54*b* is provided with a wheel torque estimating unit 54*i* for estimating a wheel torque estimated value Tw, which is an estimated value of the torque generated in the driving wheel, the motion model unit 54*e* also used by the feedforward control system 54*a* to calculate the response of the state variable of the vehicle 10 to the input torque and a FB secondary regulator unit 54*g* for calculating a FB system vibration-damping torque compensation amount U·FB, which is the correction amount of the driver requested wheel torque Tw0, for converging the state variable calculated by the motion model unit 54*e* to the minimum value based on the predetermined gain K to be described later.

In the feedback control system 54*b*, as described later, the wheel torque estimating unit 54*i* calculates the wheel torque estimated value Tw of the driving wheel based on the average value r·ω of the wheel speeds calculated based on a detection result of the wheel speed sensor 30 and the wheel torque estimated value Tw is input to the motion model unit 54*e* as a disturbance input to be used to calculate the response of the state variable of the vehicle 10 by the motion model unit 54*e*. According to this, a correction amount of the driver requested wheel torque Tw0 for the disturbance is also calculated. Also, the FB system vibration-damping torque compensation amount U·FB calculated by the FB secondary regulator unit 54*g* is a feedback control amount (FB control amount) of the driving torque in the feedback control system 54*b* according to variation in the wheel speed based on the external force or torque (disturbance) by the input from the road surface to the wheels 12FL, 12FR, 12RL and 12RR, that is to say, the vibration-damping control compensation amount in the feedback control. Meanwhile, although the motion model unit 54*e* is used by the feedforward control system 54*a* and the feedback control system 54*b* in the first embodiment, the motion model unit may be separately prepared.

In the vibration-damping controlling unit 54, the above-described FF system vibration-damping torque compensation amount U·FF, which is the FF control amount of the feedforward control system 54*a*, and the FB system vibration-damping torque compensation amount U·FB, which is the FB control amount of the feedback control system 54*b*, are transmitted to an adder 54*h* of the vibration-damping controlling unit 54. The adder 54*h* to which the FF system vibration-damping torque compensation amount U·FF and the FB system vibration-damping torque compensation amount U·FB are input adds them to each other to calculate vibration-damping control compensation wheel torque. The vibration-damping control compensation wheel torque is vibration-damping torque, which is the torque for vibration damping capable of suppressing the sprung vibration by being added to the driver requested torque.

The vibration-damping control compensation wheel torque calculated by the adder 54*h* is converted to the unit of the requested torque of the vehicle drive device 5 by the driving torque converting unit 54*d* to be transmitted to an adder 53*c* of the drive controlling unit 53. The adder 53*c* adds the vibration-damping control compensation wheel torque transmitted from the vibration-damping controlling unit 54 to the driver requested torque calculated by the driver requested torque calculating unit 53*a*.

That is to say, the drive controlling unit 53 and the vibration-damping controlling unit 54 correct the driver requested torque based on the vibration-damping control compensation wheel torque obtained based on a mechanical motion model and correct to a value capable of generating the torque, which may suppress the sprung vibration of the vehicle 10. In this manner, the driver requested torque is corrected such that the sprung vibration does not occur, and thereafter converted to the control command by the control command determining unit 53*b* to be transmitted to the vehicle drive device 5.

Next, a principle of the vibration-damping is described. As described above, the vibration-damping controlling apparatus 1 according to the first embodiment first supposes the mechanical motion model in the bounce direction and in the pitch direction of the vehicle body 11, and composes state equations of the state variables in the bounce direction and in the pitch direction to which the driver requested wheel torque Tw0 and the wheel torque estimated value Tw (disturbance) are input. Then, from such state equation, an input (torque value) to converge the state variables in the bounce direction and in the pitch direction to 0 is determined by using an optimal regulator theory and the driver requested torque is corrected based on the obtained torque value.

Figure 6:
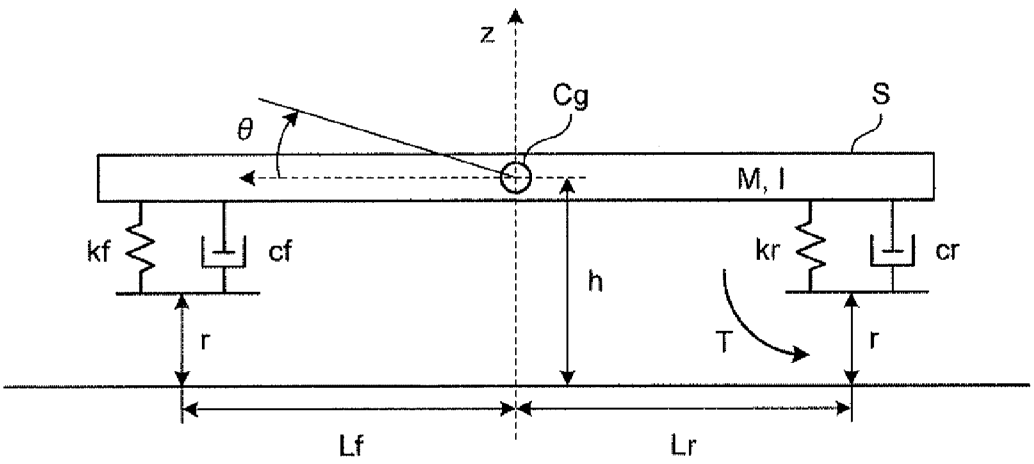
FIG. 6 is an illustrative diagram of a mechanical motion model in a bounce direction and in a pitch direction and the illustrative diagram in a case in which an sprung vibration model is used.

FIG. 6 is an illustrative diagram of the mechanical motion model in the bounce direction and in the pitch direction and the illustrative diagram in a case in which the sprung vibration model is used. As the mechanical motion model in the bounce direction and in the pitch direction of the vehicle body 11, for example, as illustrated in FIG. 6, the vehicle body 11 is regarded as a rigid body S having a mass M and inertia moment I, and suppose that such rigid body S is supported by a front wheel suspension with an elastic coefficient kf and a damping coefficient cf and a rear wheel suspension with an elastic coefficient kr and a damping coefficient cr (sprung vibration model of the vehicle body). In this case, a motion equation in the bounce direction and a motion equation in the pitch direction of the center of gravity of the vehicle body 11 are represented as in a following equation 1.

[Equation 1]

$$M\frac{d^2z}{dt^2} = -kf(z+Lf\cdot\theta) - cf\left(\frac{dz}{dt}+Lf\cdot\frac{d\theta}{dt}\right) - kr(z-Lr\cdot\theta) - cr\left(\frac{dz}{dt}-Lr\cdot\frac{d\theta}{dt}\right) \tag{1a}$$

$$I\frac{d^2\theta}{dt^2} = -Lf\left\{kf(z+Lf\cdot\theta)+cf\left(\frac{dz}{dt}+Lf\cdot\frac{d\theta}{dt}\right)\right\} + Lr\left\{kr(z-Lr\cdot\theta)+cr\left(\frac{dz}{dt}-Lr\cdot\frac{d\theta}{dt}\right)\right\} + \frac{h}{r}\cdot T \tag{1b}$$

In the equations (1a) and (1b), Lf and Lr represent distances from the center of gravity Cg to a front wheel shaft and to a rear wheel shaft, respectively, r represents the wheel radius and h represents height of the center of gravity Cg from the road surface. Meanwhile, in the equation (1a), first and second terms are components of force from the front wheel shaft and third and fourth terms are components of force from the rear wheel shaft, and in the equation (1b), a first term is a moment component of the force from the front wheel shaft and a second term is a moment component of the force from the rear wheel shaft. A third term in the equation (1b) is a moment component of force, which wheel torque T (=Tw0+Tw) generated in the driving wheel gives around the center of gravity of the vehicle body 11.

The above-described equations (1a) and (1b) can be rewritten to a format of the state equation (of a linear system) as a following equation (2a) by setting the displacements z and θ of the vehicle body 11 and the change ratios dz/dt and dθ/dt thereof as a state variable vector X(t).

$$dX(t)/dt = A\cdot X(t) + B\cdot u(t) \tag{2a}$$

Herein, X(t), A and B are represented as following matrices X(t), A and B, respectively.

[Equation 2]

$$X(t) = \begin{pmatrix} z \\ dz/dt \\ \theta \\ d\theta/dt \end{pmatrix},\ A = \begin{pmatrix} 0 & 1 & 0 & 0 \\ a1 & a2 & a3 & a4 \\ 0 & 0 & 0 & 1 \\ b1 & b2 & b3 & b4 \end{pmatrix},\ B = \begin{pmatrix} 0 \\ 0 \\ 0 \\ p1 \end{pmatrix}$$

Also, each component a1 to a4 and b1 to b4 of the matrix A is given by combining coefficients of z, θ, dz/dt and dθ/dt with the equations (1a) and (1b), and $$a1 = -(kf+kr)/M$$

$$a2 = -(cf+cr)/M$$

$$a3 = -(kf\cdot Lf - kr\cdot Lr)/M$$

$$a4 = -(cf\cdot Lf - cr\cdot Lr)/M$$

$$b1 = -(Lf\cdot kf - Lr\cdot kr)/I$$

$$b2 = -(Lf\cdot cf - Lr\cdot cr)/I$$

$b3=-(Lf^2 \cdot kf+Lr^2 \cdot kr)/I$, and $b4=-(Lf^2 \cdot cf+Lr^2 \cdot cr)/I$ are satisfied. Also, u(t) is represented as $u(t)=T$, and is an input of a system represented by the state equation (2a). Therefore, from the equation (1b), a component p1 of the matrix B is represented as $p1=h/(I \cdot r)$, In the state equation (2a), when it is set that $u(t)=-K \cdot X(t)$ (2b)

the state equation (2a) is $dX(t)/dt=(A-BK) \cdot X(t)$ (2c).

Therefore, when solving a differential equation (2c) of the state variable vector X(t) by setting an initial value $X_0(t)$ of X(t) to $X_0(t)=(0,0,0,0)$ (suppose that there is no vibration before the torque input), when the gain K to converge magnitude of X(t), that is to say, the displacements in the bounce direction and in the pitch direction and a time rate of change thereof to 0 is determined, a torque value u(t) to suppress the bounce/pitch vibration is determined.

The gain K can be determined by using the so-called optimal regulator theory. According to such theory, it is known that X(t) stably converges in the state equation (2a) when a value of an evaluation function in a quadratic form $J=\int(X^TQX+u^TRu)dt$ (3a)

(integration range is 0 to ∞) is the minimum, and a matrix K to minimize the evaluation function J is given by $K=R^{-1} \cdot B^T \cdot P$. Herein, P is a solution of a Ricatti equation $-dP/dt=A^TP+PA+Q-PBR^{-1}B^TP$. The Ricatti equation can be solved by an optional method known in a field of the linear system, and according to this, the gain K is determined.

Meanwhile, Q and R in the evaluation function J and the Ricatti equation are optionally set semi positive definite symmetric matrix and a positive definite symmetric matrix, respectively, and are weighting matrices of the evaluation function J determined by a designer of the system. For example, in a case of the motion model herein studied, Q and R are set as

[Equation 3]

$$Q=\begin{pmatrix}1 & 0 & 0 & 0\\ 0 & 10^3 & 0 & 0\\ 0 & 0 & 1 & 0\\ 0 & 0 & 0 & 10^2\end{pmatrix},\ R=(1)$$

and when norm (magnitude) of a specific component out of the components of the state vector, for example, dz/dt and dθ/dt is set to be larger than the norm of another component, for example, z and θ in an equation (3a), the component of which norm is set to be larger relatively more stably converges. Also, when a value of the component of Q is made larger, transient property is critical, that is to say, the value of the state vector rapidly converges to a stable value, and when a value of R is made larger, consumption energy is reduced. Herein, it is possible that the gain K corresponding to the feedforward control system 54*a* and the gain K corresponding to the feedback control system 54*b* are made different to each other. For example, the gain K corresponding to the feedforward control system 54*a* may be the gain corresponding to acceleration feeling of the driver and the gain K corresponding to the feedback control system 54*b* may be the gain corresponding to response and responsibility of the driver.

In actual vibration-damping control, as illustrated in the block diagram in FIG. 5, the state variable vector X(t) is calculated by solving the differential equation of the equation (2a) by using the torque input value by the motion model unit 54*e*. Subsequently, a value U(t) obtained by multiplying the gain K determined so as to converge the state variable vector X(t) to 0 or the minimum value as described above by the FF secondary regulator unit 54*f* and the FB secondary regulator unit 54*g* by the state vector X(t) being the output of the motion model unit 54*e*, that is to say, the FF system vibration-damping torque compensation amount U·FF and the FB system vibration-damping torque compensation amount U·FB are converted to the unit of the driving torque of the vehicle drive device 5 by the driving torque converting unit 54*d*, and the driver requested torque is corrected by the adder 53*c*.

The system represented by the equations (1a) and (1b) is a resonance system, and the value of the state variable vector is substantially only a component of a natural frequency of the system for an optional input. Therefore, by configuring such that the driver requested torque is corrected by (a converted value of) U(t), a component of the natural frequency of the system, that is to say, a component, which allows the sprung vibration represented by the pitch/bounce vibration to occur in the vehicle body 11, out of the driver requested torque is corrected and the sprung vibration in the vehicle body 11 is suppressed. That is to say, when the component of the natural frequency of the system disappears from the requested torque given by the driver, out of a requested torque command input to the vehicle drive device 5, the component of the natural frequency of the system is only −U(t) and the vibration by Tw (disturbance) converges.

When executing the vibration-damping control by the vibration-damping controlling apparatus 1 according to the first embodiment, a parameter of the mechanical motion model used by the motion model unit 54*e* is stored in the electronic control unit 50 in advance. The parameter, such as M, I, Lf, Lr, h, r, kf, cf, kr and cr is stored in the electronic control unit 50 and is used when calculating the FF system vibration-damping torque compensation amount U·FF and the FB system vibration-damping torque compensation amount U·FB. Also, in the electronic control unit 50, a reference specification, which is a specification of the vehicle 10 based on a state in which a passenger is not on board and a baggage is not loaded, is stored in advance, and the reference specification includes a distance Lfb from a center of gravity of the reference specification Cgb to the front wheel shaft, a distance Lrb from the center of gravity Cgb to the rear wheel shaft, a distance hb from the road surface to the center of gravity Cgb and a mass Mb in the center of gravity Cgb, and the like. Herein, initial values of the parameters M, LF, Lr and h are Mb, Lfb, Lrb and hb, respectively.

Figure 7:
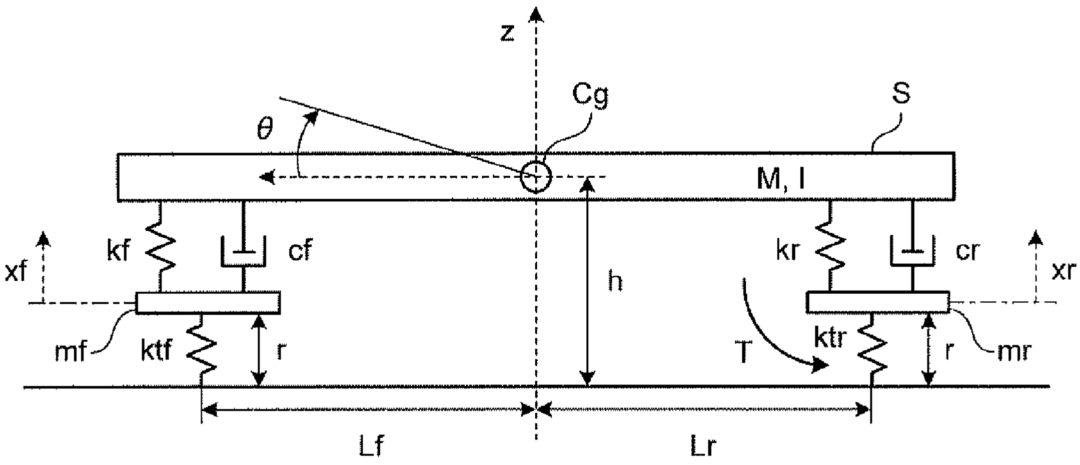
FIG. 7 is an illustrative diagram of the mechanical motion model in the bounce direction and in the pitch direction and is the illustrative diagram in a case in which a sprung/unsprung vibration model is used.

FIG. 7 is an illustrative diagram of the mechanical motion model in the bounce direction and in the pitch direction and is the illustrative diagram in a case in which an sprung/unsprung vibration model is used. Meanwhile, as the mechanical motion model in the bounce direction and in the pitch direction of the vehicle body 11, for example, as illustrated in FIG. 7, a model, which takes into account spring elasticity of tires of the front wheel and the rear wheel (sprung/unsprung vibration model of the vehicle body) may be adopted in addition to the configuration in FIG. 6. If the tires of the front wheel and the rear wheel have elastic coefficients ktf and ktr, respectively, as is understood from FIG. 7, the motion equation in the bounce direction and the motion equation in the pitch direction of the center of gravity Cg of the vehicle body 11 are represented as in a following equation 4.

[Equation 4]

$$M\frac{d^2 z}{dt^2} = -kf(z + Lf\cdot\theta - xf) - cf\left(\frac{dz}{dt} + Lf\cdot\frac{d\theta}{dt} - \frac{dxf}{dt}\right) - kf(z - Lr\cdot\theta - xr) - cr\left(\frac{dz}{dt} - Lr\cdot\frac{d\theta}{dt} - \frac{dxr}{dt}\right) \quad (4a)$$

$$I\frac{d^2 z}{dt^2} = -Lf\left\{kf(z + Lf\cdot\theta - xf) + cf\left(\frac{dz}{dt} + Lf\cdot\frac{d\theta}{dt} - \frac{dxf}{dt}\right)\right\} + Lr\left\{kf(z - Lr\cdot\theta - xr) + cr\left(\frac{dz}{dt} - Lr\cdot\frac{d\theta}{dt} - \frac{dxr}{dt}\right)\right\} + \frac{h}{r}\cdot T \quad (4b)$$

$$mf\frac{d^2 xf}{dt^2} = kf(z + Lf\cdot\theta - xf) + cf\left(\frac{dz}{dt} + Lf\cdot\frac{d\theta}{dt} - \frac{dxf}{dt}\right) + ktf\cdot xf \quad (4c)$$

$$mr\frac{d^2 xr}{dt^2} = kr(z - Lr\cdot\theta - xr) + cr\left(\frac{dz}{dt} - Lf\cdot\frac{d\theta}{dt} - \frac{dxr}{dt}\right) + ktr\cdot xr \quad (4d)$$

In equations (4a), (4b), (4c) and (4d), xf and xr represent unsprung displacement amounts of the front wheel and the rear wheel and mf and mr represent unsprung masses of the front wheel and the rear wheel, respectively. The equations (4a) and (4b) compose the state equation as the equation (2a) as in the case of FIG. 6 by setting z, θ, xf and xr and temporal differential values thereof as the state variable vector (the matrix A has 8 rows and 8 columns and the matrix B has 8 rows and 1 column) and can determine a gain matrix K to converge the magnitude of the state variable vector to 0 according to the optimal regulator theory. The actual vibration-damping control is similar to that in FIG. 6.

Next, wheel torque estimated value calculation is described. In the feedback control system 54*b* of the vibration-damping controlling unit 54 illustrated in FIG. 5, although it may be configured such that the wheel torque input as the disturbance is actually detected by providing torque sensors on each wheel 12FL, 12FR, 12RL and 12RR, for example, the wheel torque estimated value Tw estimated from another detectable value in the traveling vehicle 10 by the wheel torque estimating unit 54*i* is herein used.

The wheel torque estimated value Tw can be estimated and calculated by a next equation (5) by using temporal differentiation of the wheel rotational speed w or the wheel speed value r·ω obtained by the wheel speed sensors 30FL, 30FR, 30RL and 30RR corresponding to each wheel 12FL, 12FR, 12RL and 12RR, for example.

$$Tw=M\cdot r^2\cdot d\omega/dt \quad (5)$$

Meanwhile, in the equation (5), M represents the mass of the vehicle and r represents the wheel radius.

In detail, when the sum of the driving force generated at a site at which the driving wheel touches the road surface is equal to total driving force M·G (G is acceleration) of the vehicle 10, the wheel torque estimated value Tw is given by a next equation (5a).

$$Tw=M\cdot G\cdot r \quad (5a)$$

Also, the acceleration G of the vehicle 10 is given by a next equation (5b) by a differentiation value of the wheel speed r·ω.

$$G=r\cdot d\omega/dt \quad (5b)$$

Therefore, the wheel torque is estimated as in the equation (5).

In the vibration-damping controlling apparatus 1 according to the first embodiment, the vibration-damping controlling unit 54 for setting the vibration-damping torque based on the FF system vibration-damping torque compensation amount, which is the FF control amount of the driver requested torque in the feedforward control system 54*a* based on the driver requested torque being the control amount corresponding to the drive request of the driver, and the FB system vibration-damping torque compensation amount, which is the FB control amount of the driver requested torque in the feedback control system 54*b* based on the wheel speed, corrects the FF system vibration-damping torque compensation amount or the FB system vibration-damping torque compensation amount based on an operational state of the vehicle 10, thereby realizing appropriate vibration-damping control according to the operational state of the vehicle 10.

Herein, as described above, in the vibration-damping controlling unit 54, although the feedforward control system 54*a* and the feedback control system 54*b* use the motion model unit 54*e* together, they are basically composed as independent separate control systems to set the vibration-damping control compensation wheel torque by calculating the FF system vibration-damping torque compensation amount and the FB system vibration-damping torque compensation amount and thereafter adding the FF system vibration-damping torque compensation amount and the FB system vibration-damping torque compensation amount. Therefore, the vibration-damping controlling unit 54 can perform upper and lower limit guard and correction separately to the FF system vibration-damping torque compensation amount of the feedforward control system 54*a* and the FB system vibration-damping torque compensation amount of the feedback control system 54*b* before actually setting the vibration-damping control compensation wheel torque. Also, according to this, it becomes easy to block any one control according to a condition of the vehicle 10.

Then, the vibration-damping controlling unit 54 of the vibration-damping controlling apparatus 1 according to the first embodiment is further provided with a FF control correcting unit 54*j* and a FF control gain setting unit 54*k* in the feedforward control system 54*a* and with a FB control correcting unit 54*m* and a FB control gain setting unit 54*n* in the feedback control system 54*b*. The vibration-damping controlling unit 54 corrects the FB system vibration-damping torque compensation amount by the FB control correcting unit 54*m* and the FB control gain setting unit 54*n* while correcting the FF system vibration-damping torque compensation amount by the FF control correcting unit 54*j* and the FF control gain setting unit 54*k*. That is to say, the vibration-damping controlling unit 54 corrects the FF system vibration-damping torque compensation amount by setting a FF control gain according to the state of the vehicle 10 for the FF system vibration-damping torque compensation amount and by multiplying the FF control gain by the FF system vibration-damping torque compensation amount, and corrects the FB system vibration-damping torque compensation amount by setting the FB control gain according to the state of the vehicle 10 for the FB system vibration-damping torque compensation amount and by multiplying the FB control gain by the FB system vibration-damping torque compensation amount.

The FF control correcting unit 54*j* is arranged on a subsequent stage of the FF secondary regulator unit 54*f* and a precedent stage of the adder 54*h*. When the FF system vibration-damping torque compensation amount U·FF is input from the FF secondary regulator unit 54*f* to the FF control correcting unit 54*j*, the FF control correcting unit 54*j* multiplies the FF control gain K·FF set by the FF control gain setting unit 54_k_ to correct the FF system vibration-damping torque compensation amount U·FF based on the FF control gain K·FF. The FF control correcting unit 54_j_, which corrects the FF system vibration-damping torque compensation amount U·FF in this manner, outputs the corrected FF system vibration-damping torque compensation amount U·FF to the adder 54_h_. Herein, when the FF control gain setting unit 54_k_ sets the FF control gain K·FF, the FF control gain setting unit 54_k_ sets the FF control gain K·FF according to the state of the vehicle 10. Therefore, the FF system vibration-damping torque compensation amount U·FF input from the FF secondary regulator unit 54_f_ to the FF control correcting unit 54_j_ is corrected according to the state of the vehicle 10 by the FF control correcting unit 54_j_ by multiplication of the FF control gain K·FF set by the FF control gain setting unit 54_k_.

Also, the FB control correcting unit 54_m_ is arranged on a subsequent stage of the FB secondary regulator unit 54_g_ and a precedent stage of the adder 54_h_. When the FE system vibration-damping torque compensation amount U·FB is input from the FB secondary regulator unit 54_g_ to the FB control correcting unit 54_m_, the FB control correcting unit 54_m_ multiplies the FB control gain K·FB set by the FB control gain setting unit 54_n_ to correct the FB system vibration-damping torque compensation amount U·FB based on the FB control gain K·FE. The FE control correcting unit 54_m_, which corrects the FB system vibration-damping torque compensation amount U·FB in this manner outputs the corrected FE system vibration-damping torque compensation amount U·FB to the adder 54_h_. Herein, when the FE control gain setting unit 54_n_ sets the FB control gain K·FB, the FB control gain setting unit 54_n_ sets the FE control gain K·FE according to the state of the vehicle 10. Therefore, the FE system vibration-damping torque compensation amount U·FE input from the FB secondary regulator unit 54_g_ to the FB control correcting unit 54_m_ is corrected according to the state of the vehicle 10 by the FB control correcting unit 54_m_ by multiplication of the FB control gain K·FB set by the FB control gain setting unit 54_n_.

Meanwhile, the FF control correcting unit 54_j_ and the FB control correcting unit 54_m_ may perform the upper and lower limit guard such that the FF system vibration-damping torque compensation amount U·FF and the FB system vibration-damping torque compensation amount U·FB are within a range of upper and lower limit guard values set in advance. The FF control correcting unit 54_j_ and the FB control correcting unit 54_m_ may perform the upper and lower limit guard to the FF system vibration-damping torque compensation amount U·FF and the FB system vibration-damping torque compensation amount U·FB input from the FF secondary regulator unit 54_f_ and the FB secondary regulator unit 54_g_, respectively, for example, by setting values corresponding to an allowable engine torque variable value as an allowable driving force variable value of the engine 22 set in advance as the upper and lower limit guard values to correct the FF system vibration-damping torque compensation amount U·FF and the FB system vibration-damping torque compensation amount U·FB. According to this, the FF control correcting unit 54_j_ and the FB control correcting unit 54_m_ can set appropriate FF system vibration-damping torque compensation amount U·FF and the FB system vibration-damping torque compensation amount U·FB, which take into account control other than the sprung vibration-damping control by the vibration-damping controlling unit 54, for example, thereby inhibiting interference between the sprung vibration-damping control by the vibration-damping controlling unit 54 and another control.

Also, the FF control correcting unit 54_j_ and the FB control correcting unit 54_m_ may perform the upper and lower limit guard to the FF system vibration-damping torque compensation amount U·FF and the FB system vibration-damping torque compensation amount U·FB before being output to the adder 54_h_, for example, by setting values corresponding to allowable acceleration and deceleration of the vehicle 10 set in advance as the upper and lower limit guard values (for example, a range within ±a/100G when being converted to the acceleration and the deceleration) to correct the FF system vibration-damping torque compensation amount U·FF and the FB system vibration-damping torque compensation amount U·FB. According to this, the FF control correcting unit 54_j_ and the FB control correcting unit 54_m_ can set the appropriate FF system vibration-damping torque compensation amount U·FF and the FB system vibration-damping torque compensation amount U·FB capable of preventing change in the motion of the vehicle 10 from becoming large beyond expectation of the driver by the sprung vibration-damping control by the vibration-damping controlling unit 54 for improving steering stability of the driver, driving quality of the passenger and the like, for example, and preventing a feeling of discomfort of the driver.

Also, the vibration-damping controlling unit 54 may correct the FF system vibration-damping torque compensation amount and the FB system vibration-damping torque compensation amount by the FF control correcting unit 54_j_ and the FB control correcting unit 54_m_, respectively, based on a vehicle speed of the vehicle 10, a gear position when the automatic transmission 26 loaded on the vehicle 10 has a plurality of gear positions, an engine rotational speed and the requested torque of the engine 22 as the parameters indicating the state of the vehicle 10. Also, the vibration-damping controlling unit 54 may correct the FB system vibration-damping torque compensation amount based on a drive state of the automatic transmission 26 by the FB control correcting unit 54_m_. Further, when the power source is the internal-combustion engine, the vibration-damping controlling unit 54 may correct the FB system vibration-damping torque compensation amount based on an allowable target fuel injection amount and an allowable target intake air amount of the internal-combustion engine by the FB control correcting unit 54_m_. That is to say, the FF control gain setting unit 54_k_ and the FB control gain setting unit 54_n_ may set the FF control gain K·FF and the FB control gain K·FB based on them.

While the vibration-damping controlling apparatus 1 according to the first embodiment performs the vibration-damping control such that the sprung vibration of the vehicle 10 does not occur in this manner, this also performs the learning correction of the air-fuel ratio by the learning correcting unit 55. Since both of the vibration-damping control and the learning correction of the air-fuel ratio are performed by controlling the power generated by the engine 22, the controls might interfere with each other when both controls are performed simultaneously, so that the vibration-damping controlling apparatus 1 according to the first embodiment judges whether to execute the vibration-damping control according to the state of the learning correction of the air-fuel ratio and inhibits the vibration-damping control when the learning correction of the air-fuel ratio and the vibration-damping control interfere with each other.

That is to say, during the learning of the air-fuel ratio at the time of the operation of the engine 22, magnitude of the vibration-damping control compensation wheel torque, which is the torque to be added to the driver requested torque, capable of suppressing the sprung vibration is made different from that when the learning of the air-fuel ratio is not performed, and the vibration-damping control compensation wheel torque to be added to the driver requested torque is set to 0. According to this, a state in which the vibration-damping control is inhibited is obtained.

Although the purge gas is allowed to flow to the intake passage 71 at the time of the operation of the engine 22, the concentration of the purge gas in the mixture gas to be burned in the combustion chamber 70 is also taken into account when the learning correction of the air-fuel ratio is performed, and when the concentration of the purge gas is the predetermined concentration or more, the vibration-damping control is similarly inhibited.

Figure 8:
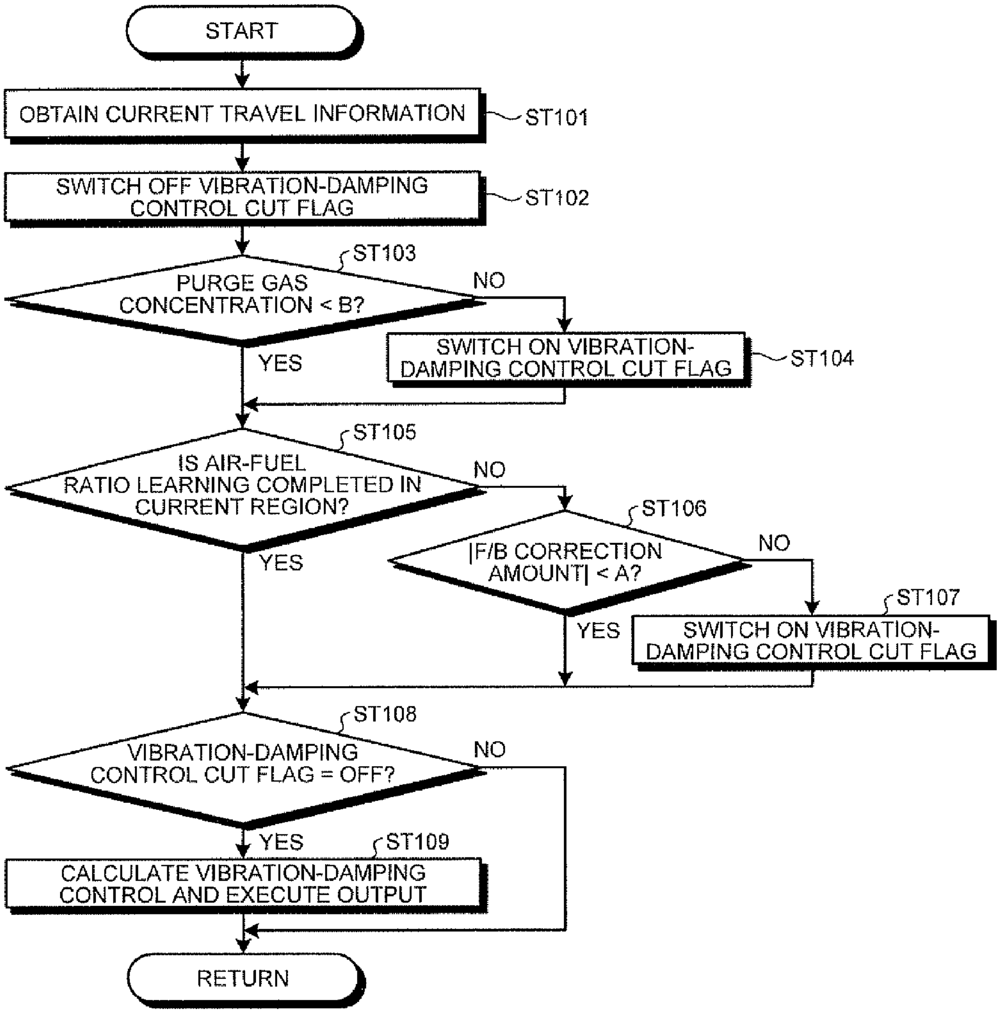
FIG. 8 is a flow diagram illustrating an overview of a processing procedure of the vibration-damping controlling apparatus according to the first embodiment.

FIG. 8 is a flow diagram illustrating an overview of a processing procedure of the vibration-damping controlling apparatus according to the first embodiment. Next, a method of controlling the vibration-damping controlling apparatus 1 according to the first embodiment, that is to say, the overview of the processing procedure of the vibration-damping controlling apparatus 1 is described. Meanwhile, a following process is the processing procedure when judging whether to inhibit the vibration-damping control, and this is called for each predetermined period to be executed when controlling each part at the time of the operation of the vehicle 10. In the processing procedure of the vibration-damping controlling apparatus 1 according to the first embodiment, current travel state information is first obtained (step ST101). This is obtained by a travel state obtaining unit 57 of the drive control device 51 of the electronic control unit 50. The travel state obtaining unit 57 obtains information of the learning correction of the air-fuel ratio by the learning correcting unit 55, purge concentration, which is the concentration of the purge flowing in the intake passage 71, and a control amount when performing the sprung vibration damping as the current travel state information.

Next, the vibration-damping control cut flag is switched off (step ST102). When switching off the vibration-damping control cut flag (not illustrated), the flag switching unit 58 of the drive control device 51 of the electronic control unit 50 operates the vibration-damping switch. The vibration-damping control cut flag is provided on the electronic control unit 50 as the flag indicating whether to inhibit the vibration-damping control, and it is indicated that it is necessary to inhibit the vibration-damping control when the vibration-damping control cut flag is switched on and that it is not necessary to inhibit the vibration-damping control and it is in a state capable of executing the vibration-damping control when the vibration-damping control cut flag is switched off. The sprung vibration may be suppressed by executing the vibration-damping control when there is no problem in executing the vibration-damping control, so that the vibration-damping control cut flag is generally switched off.

Next, it is judged whether the purge gas concentration<B is satisfied (step ST103). The judgment is performed by the purge gas concentration judging unit 59 of the drive control device 51 of the electronic control unit 50. When the purge gas concentration judging unit 59 judges the purge gas concentration, this first calculates the purge gas concentration. The purge gas concentration is calculated based on the injection amount of the fuel by the fuel injector 74 controlled by the drive control device 51, a detection result of an air flow meter (not illustrated) provided on the intake passage 71 for detecting the flow amount of the air flowing through the intake passage 71 and the opening degree of the purge control valve 81. The electronic control unit 50 calculates the ratio of the purge gas in the mixture gas flowing in the combustion chamber 70 as the purge gas concentration based on the control amount of the fuel injector 74 and the like and the detection result.

Meanwhile, when calculating the purge gas concentration in this manner, it is also possible to provide a purge gas concentration sensor (not illustrated) capable of detecting the concentration of the purge gas in the gas flowing through the purge passage 80 on the purge passage 80 to calculate including a detection result of the purge gas concentration sensor.

The purge gas concentration judging unit 59 judges whether the purge gas concentration calculated in this manner is smaller than a purge gas concentration reference value B being a predetermined value. The purge gas concentration reference value B used in the judgment is set in advance as a threshold value when judging whether a current operational state of the engine 22 has the concentration of the purge gas used at the time of the general operation of the engine 22 and is stored in the electronic control unit 50. The purge gas concentration judging unit 59 compares the purge gas concentration reference value B stored in the electronic control unit 50 in this manner and the calculated current purge gas concentration to judge whether the current purge gas concentration<the purge gas concentration reference value B is satisfied.

When it is judged that the purge gas concentration<B is not satisfied by the judgment by the purge gas concentration judging unit 59 (step ST103), that is to say, when it is judged that the current purge gas concentration is the purge gas concentration reference value B or more, the vibration-damping control cut flag is switched on (step ST104). When the vibration-damping control cut flag (not illustrated) is switched on, this is switched on by the flag switching unit 58 of the drive control device 51 of the electronic control unit 50. The vibration-damping control cut flag is provided on the electronic control unit 50 as the flag indicating whether to inhibit the vibration-damping control, and when the vibration-damping control cut flag is switched on, it is indicated that the operational state of the vehicle 10 or the operational state of the engine 22 is in a state in which the vibration-damping control is preferably inhibited, and when the vibration-damping control cut flag is switched off, it is indicated that the vibration-damping control may be executed without problem. The flag switching unit 58 switches on or off the vibration-damping control cut flag according to a judgment result of the purge gas concentration judging unit 59, and when the purge gas concentration judging unit 59 judges that the purge gas concentration is the purge gas concentration reference value B or more, this switches on the vibration-damping control cut flag.

When it is judged that the purge gas concentration<B is satisfied by the judgment by the purge gas concentration judging unit 59 (step ST103) or when the vibration-damping control cut flag is switched on by the judgment that the purge gas concentration<B is not satisfied (step ST104), it is next judged whether the learning correction of the air-fuel ratio is completed in a current travel region (step ST105). This is judged by a learning completion judging unit 60 of the drive control device 51 of the electronic control unit 50. That is to say, while the learning correcting unit 55 of the drive control device 51 performs the learning correction of the air-fuel ratio at the time of the operation of the engine 22, the learning completion judging unit 60 judges whether the learning correction of the air-fuel ratio in the current travel region is completed.

When judging whether the learning correction is completed, the learning completion judging unit 60 judges based on the air-fuel ratio detected by the air-fuel ratio sensor 83 and the $O_2$ sensor 84. When judging this, it is judged that the learning correction of the air-fuel ratio is completed when a difference between the oxygen concentration in the exhaust gas detected by the air-fuel ratio sensor 83 and the $O_2$ sensor 84 and the oxygen concentration in the exhaust gas appropriate in the current operational state of the engine 22 is within a predetermined range.

When it is judged that the learning correction of the air-fuel ratio is not completed in the current travel region by the judgment by the learning completion judging unit 60 (step ST105), it is next judged whether |F/B correction amount|<A is satisfied (step ST106). This is judged by the F/B correction amount judging unit 61 of the drive control device 51 of the electronic control unit 50. That is to say, when the learning correcting unit 55 performs the learning correction of the air-fuel ratio, this performs feedback (F/B) correction, which is the correction of the injection amount of the fuel by the fuel injector 74 based on the oxygen concentration in the exhaust gas detected by the air-fuel ratio sensor 83 and the $O_2$ sensor 84, and the F/B correction amount judging unit 61 judges whether an absolute value of the F/B correction amount, which is the correction amount of the injection amount of the fuel when performing the F/B correction in this manner is smaller than a correction amount reference value A, which is a predetermined value.

The correction amount reference value A used in the judgment is set in advance as a threshold value when judging whether the correction amount when performing the F/B correction to the injection amount of the fuel by the fuel injector 74 by the learning correcting unit 55, that is to say, a shift amount of the injection amount of the fuel before the learning correction to the injection amount of the fuel capable of realizing an appropriate air-fuel ratio is within a predetermined range, and is stored in the electronic control unit 50. The F/B correction amount judging unit 61 compares the correction amount reference value A stored in the electronic control unit 50 in this manner and the absolute value of the F/B correction amount when performing the F/B correction to the injection amount of the fuel by the learning correcting unit 55 to judge whether |F/B correction amount|<the correction amount reference value A is satisfied.

When it is judged that |F/B correction amount|<A is not satisfied by the judgment by the F/B correction amount judging unit 61 (step ST106), that is to say, when it is judged that the absolute value of the F/B correction amount is the correction amount reference value A or more, the vibration-damping control cut flag is switched on by operating the vibration-damping control cut flag to switch by the flag switching unit 58 (step ST107).

In this manner, when the vibration-damping control cut flag is switched on by the judgment that the learning correction of the air-fuel ratio is not completed in the current travel region (step ST105) and that |F/B correction amount|<A is not satisfied (step ST106), or when it is judged that the learning correction of the air-fuel ratio is completed in the current travel region by the judgment by the learning completion judging unit 60 (step ST105), or when it is judged that |F/B correction amount|<A is satisfied by the judgment by the F/B correction amount judging unit 61 (step ST106), it is next judged whether the vibration-damping control cut flag=off is satisfied (step ST108). This is judged by the flag judging unit 62 of the drive control device 51 of the electronic control unit 50. The flag judging unit 62 judges whether the vibration-damping control cut flag, which is the flag indicating whether to inhibit the vibration-damping control, is in a switched off state.

When it is judged that the vibration-damping control cut flag=off is satisfied by the judgment by the flag judging unit 62 (step ST108), the vibration-damping control is calculated and an output is executed (step ST109). That is to say, by performing the various calculations of the above-described vibration-damping control by the drive controlling unit 53 and the vibration-damping controlling unit 54 to output the calculated result, the vibration-damping control is executed. After performing the process to execute the vibration-damping control in this manner, it gets out of the processing procedure.

On the other hand, when it is judged that the vibration-damping control cut flag=off is not satisfied by the judgment by the flag judging unit 62 (step ST108), that is to say, when it is judged that the vibration-damping control cut flag=on is satisfied, it gets out of the processing procedure without executing the vibration-damping control. Specifically, by setting the gain of the vibration-damping control compensation wheel torque to be added to the driver requested torque to 0, a state in which the torque capable of suppressing the sprung vibration is not added to the driver requested torque is obtained and a state in which the vibration-damping control is inhibited is obtained. In this manner, when the vibration-damping control cut flag=on is satisfied, by setting the vibration-damping control compensation wheel torque to 0, it gets out of the processing procedure without executing the vibration-damping control.

Since the vibration-damping control is inhibited when it is judged that the learning correction of the air-fuel ratio is not completed in the above-described vibration-damping controlling apparatus 1, the interference between the vibration-damping control and the control of the learning correction of the air-fuel ratio can be suppressed. That is to say, when the learning correction of the air-fuel ratio is not completed and when the learning of the air-fuel ratio at the time of the operation of the engine 22 is performed, the magnitude of the vibration-damping control compensation wheel torque is made different from that when the learning of the air-fuel ratio is not performed and the vibration-damping control compensation wheel torque to be added to the driver requested torque is set to 0. According to this, it becomes possible to suppress a state in which the learning correction cannot be performed appropriately due to the addition of the vibration-damping control compensation wheel torque to the driver requested torque when the learning correction of the air-fuel ratio is performed, thereby suppressing the interference between the vibration-damping control and the control of the learning correction of the air-fuel ratio. Therefore, the learning correction of the air-fuel ratio can be more certainly performed and the air-fuel ratio can be made a desired air-fuel ratio more certainly, so that property of the exhaust gas can be made desired one according to this and the exhaust gas may be effectively purified by the catalyst 82. As a result, it is possible to achieve a good balance between the vibration-damping control and emission performance.

Although it is controlled including the purge amount when controlling the air-fuel ratio, the purge amount might change depending on whether the learning correction of the air-fuel ratio is completed. Therefore, when it is judged that the learning correction of the air-fuel ratio is not completed, by inhibiting the vibration-damping control, the learning correction of the air-fuel ratio can be appropriately performed, and in association with this, the purge amount may be appropriately controlled. As a result, it is possible to achieve a good balance between the vibration-damping control and the control of the purge amount.

Also, since the vibration-damping control is inhibited when it is judged that the current purge gas concentration is the purge gas concentration reference value B or more, the vibration-damping control may be more appropriately performed. That is to say, in the amount of the fuel to be supplied to the engine 22, the ratio of the purge gas in the fuel to be supplied to the combustion chamber 70 increases as the purge gas concentration increases, on the other hand, the vibration-damping control suppresses the sprung vibration by adjusting the torque generated in the engine 22, so that the amount and the air-fuel ratio of the mixture gas are changed according to the sprung vibration at the time of the vibration-damping control. Therefore, when performing the vibration-damping control, the injection amount of the fuel injected from the fuel injector 74 is adjusted and the purge amount is also adjusted, and an adjustment amount of the purge amount adjusted at the time of the vibration-damping control also increases when the purge gas concentration is high. Although the purge amount is adjusted by adjusting the opening degree of the purge control valve 81 provided on the purge passage 80, since a reaction rate of the change of the purge amount relative to the operation of the purge control valve 81 is slow in the purge gas flowing in the intake passage 71 by the adjustment of the purge control valve 81, so that even in a case in which the purge amount is adjusted at the time of the vibration-damping control, a changing rate of the purge amount is slow.

On the other hand, rapid change in the torque is required in the vibration-damping control, so that when the vibration-damping control is performed in a state in which the purge gas concentration is high, there is a case in which an adjusting rate of the mixture gas becomes slow due to the large purge amount of which reaction rate is slow and the torque change becomes slow. Therefore, when it is judged that the current purge gas concentration is the purge gas concentration reference value B or more, by inhibiting the vibration-damping control, the rate of the torque change at the time of the vibration-damping control can be secured. As a result, the vibration-damping control can be more appropriately performed.

Also, since the vibration-damping control is inhibited when the absolute value of the F/B correction amount is judged to be the correction amount reference value A or more, the emission performance can be secured. That is to say, the fact that the absolute value of the F/B correction amount is the correction amount reference value A or more indicates that the air-fuel ratio is largely different from an ideal air-fuel ratio in a case in which the emission and the like is taken into account. Therefore, when the vibration-damping control is performed in this state, the air-fuel ratio might be further different from the ideal air-fuel ratio, however, by inhibiting the vibration-damping control when it is judged that the absolute value of the F/B correction amount is the correction amount reference value A or more, it is possible to suppress the air-fuel ratio from being largely different from the ideal air-fuel ratio. As a result, deterioration in the emission performance when performing the vibration-damping control can be suppressed.

Second Embodiment

Figure 9:
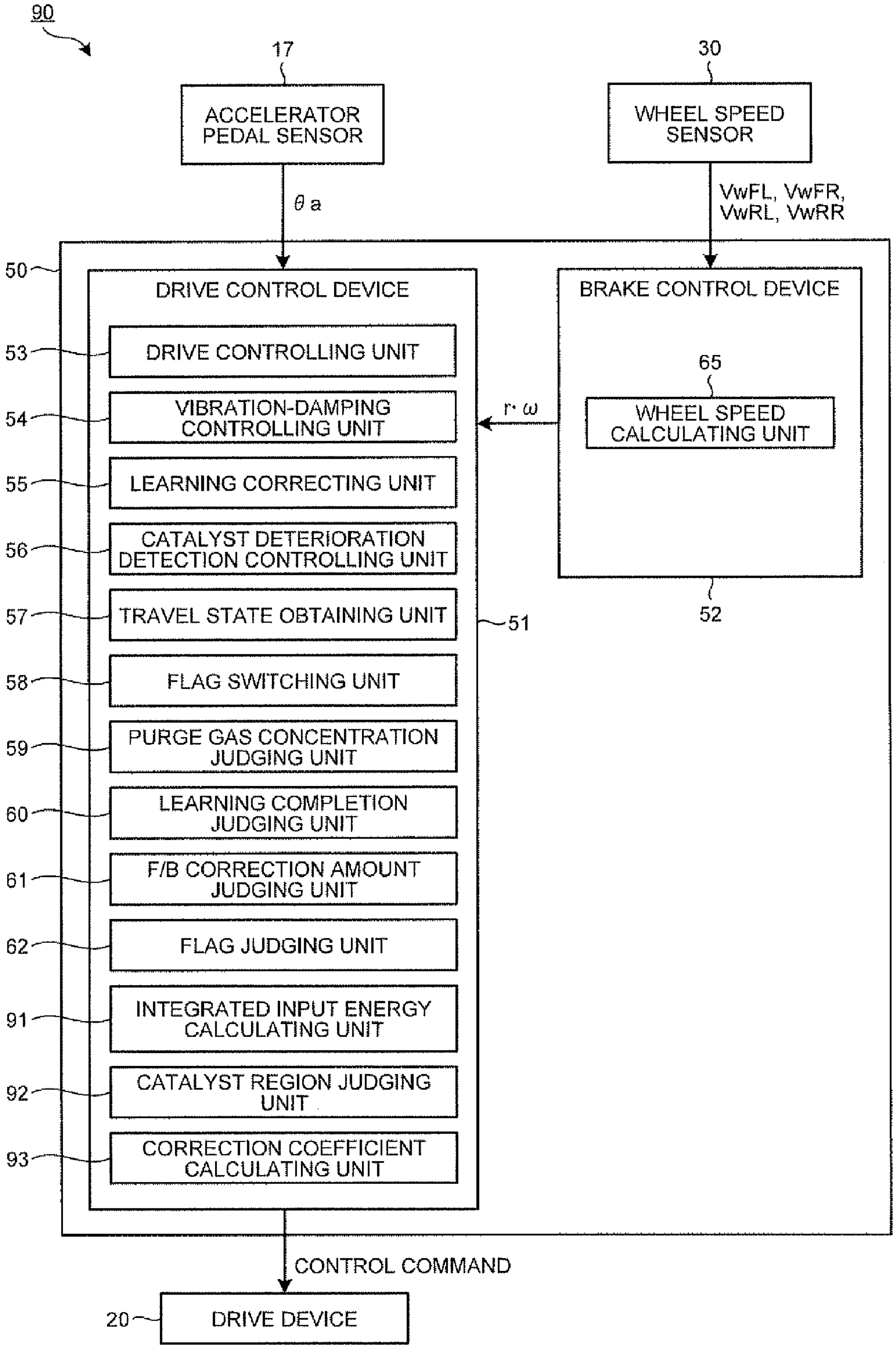
FIG. 9 is a configuration diagram of a substantial part of the vibration-damping controlling apparatus according to a second embodiment.

Although a vibration-damping controlling apparatus 90 according to a second embodiment has a substantially similar configuration as that of the vibration-damping controlling apparatus 1 according to the first embodiment, this is characterized by adjusting the control amount at the time of the vibration-damping control according to a state of the deterioration of the catalyst 82. Since the configuration other than that is similar to that of the first embodiment, the description thereof is omitted and the same reference numeral is given thereto. FIG. 9 is a configuration diagram of a substantial part of the vibration-damping controlling apparatus according to the second embodiment. The vibration-damping controlling apparatus 90 according to the second embodiment inhibits the vibration-damping control when performing the learning correction of the air-fuel ratio as in the case of the vibration-damping controlling apparatus 1 according to the first embodiment. Further, the vibration-damping controlling apparatus 90 according to the second embodiment adjusts the control amount of the vibration-damping control according to the state of the deterioration of the catalyst 82 when it is judged that the catalyst 82 is deteriorated.

Therefore, in the vibration-damping controlling apparatus 90 according to the second embodiment, the electronic control unit 50 includes the drive control device 51 and the brake control device 52, and out of them, the drive control device 51 further includes, in addition to the configuration of the drive control device 51 in the vibration-damping controlling apparatus 1 according to the first embodiment, an integrated input energy calculating unit 91 for calculating an integrated value of energy input to the catalyst 82 by the exhaust gas flowing to the catalyst 82, a catalyst region judging unit 92 for judging whether a current state of the catalyst 82 is in an activated region, and a correction coefficient calculating unit 93 for calculating a correction coefficient of the control amount at the time of the vibration-damping control based on the state of the catalyst 82.

The vibration-damping controlling apparatus 90 according to the second embodiment is configured as described above, and an action thereof is hereinafter described. In the vibration-damping controlling apparatus 90 according to the second embodiment, the state of the deterioration of the catalyst 82 for purifying the exhaust gas is judged by the catalyst region judging unit 92 of the drive control device 51. When performing the vibration-damping control by the drive controlling unit 53 and the vibration-damping controlling unit 54, it is controlled according to the state of the deterioration of the catalyst 82. In detail, at the time of the vibration-damping control, the magnitude of the vibration-damping control compensation wheel torque to be added to the driver requested torque is made different according to the state of the deterioration of the catalyst 82. When the catalyst 82 is deteriorated, the vibration-damping control is performed according to the state of the deterioration of the catalyst 82 by adjusting the vibration-damping control compensation wheel torque in this manner.

Figure 10:
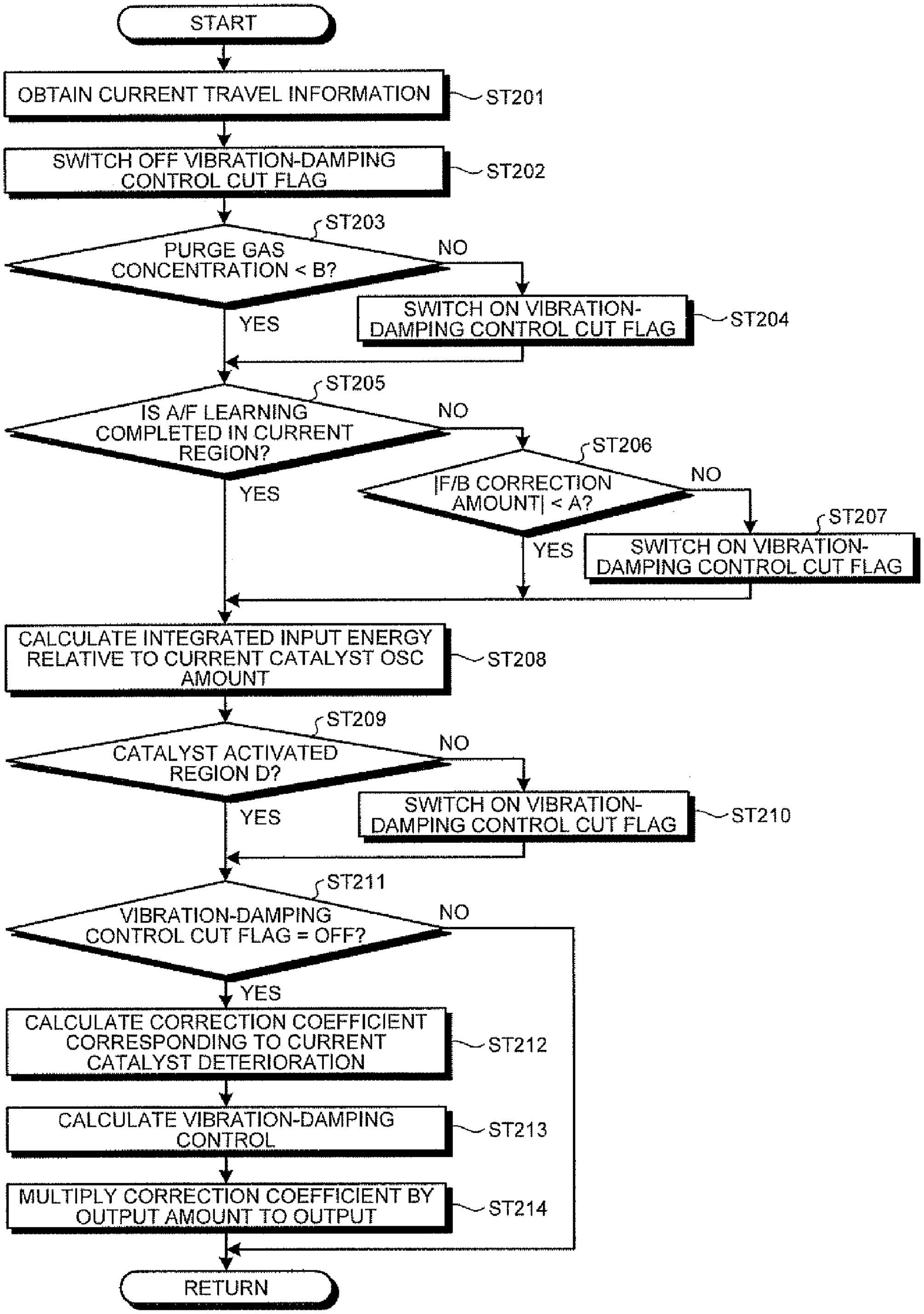
FIG. 10 is a flow diagram illustrating an overview of a processing procedure of the vibration-damping controlling apparatus according to the second embodiment.

FIG. 10 is a flow diagram illustrating an overview of the processing procedure of the vibration-damping controlling apparatus according to the second embodiment. Next, a method of controlling the vibration-damping controlling apparatus 90 according to the second embodiment, that is to say, the overview of the processing procedure of the vibration-damping controlling apparatus 90 is described. Meanwhile, a following process is the processing procedure when judging whether to inhibit the vibration-damping control, and this is called for each predetermined period to be executed when controlling each part at the time of the operation of the vehicle 10. In the processing procedure of the vibration-damping controlling apparatus 90 according to the second embodiment, the travel state obtaining unit 57 first obtains the current travel state information (step ST201). Next, the flag switching unit 58 switches off the vibration-damping control cut flag (step ST202). Next, the purge gas concentration judging unit 59 judges whether the purge gas concentration<the purge gas concentration reference value B is satisfied (step ST203).

When it is judged that the purge gas concentration<B is not satisfied by the judgment by the purge gas concentration judging unit 59 (step ST203), the flag switching unit 58 switches on the vibration-damping control cut flag (step ST204). When it is judged that the purge gas concentration<B is satisfied by the judgment by the purge gas concentration judging unit 59 (step ST203), or when the vibration-damping control cut flag is switched on by the judgment that the purge gas concentration<B is not satisfied (step ST204), the learning completion judging unit 60 next judges whether the learning correction of the air-fuel ratio is completed in the current travel region (step ST205).

When it is judged that the learning correction of the air-fuel ratio is not completed in the current travel region by the judgment by the learning completion judging unit 60 (step ST205), it is next judged whether |F/B correction amount|<the correction amount reference value A is satisfied by the F/B correction amount judging unit 61 (step ST206). When it is judged that |F/B correction amount|<A is not satisfied by the judgment by the F/B correction amount judging unit 61 (step ST206), the vibration-damping control cut flag is switched on by the flag switching unit 58 (step ST207).

In this manner, when the vibration-damping control cut flag is switched on by the judgment that the learning correction of the air-fuel ratio is not completed in the current travel region (step ST205) and that |F/B correction amount|<A is not satisfied (step ST206), or when it is judged that the learning correction of the air-fuel ratio is completed in the current travel region by the judgment by the learning completion judging unit 60 (step ST205), or when it is judged that |F/B correction amount|<A is satisfied by the judgment by the F/B correction amount judging unit 61 (step ST206), the integrated input energy relative to a current oxygen storage capacity (OSC) amount is next calculated (step ST208). The integrated input energy is calculated by the integrated input energy calculating unit 91 of the drive control device 51.

The integrated input energy calculating unit 91 calculates the energy input to the catalyst 82 calculated by the amount of the exhaust gas flowing to the catalyst 82 based on the injection amount of the fuel injected from the fuel injector 74 and the intake air amount detected by the air flow meter and calculates the integrated input energy being the integrated value of the energy. Further, the integrated input energy calculating unit 91 calculates the integrated input energy relative to the oxygen storage amount (OSC amount), which is the amount of oxygen, which may be stored in the catalyst 82 when calculating the integrated input energy.

Meanwhile, since the OSC amount indicates the amount of oxygen in the exhaust gas, which may be stored in the catalyst 82, the current OSC amount is obtained based on the detection result of the air-fuel ratio sensor 83 arranged on an upstream side of the catalyst 82 and the detection result of the $O_2$ sensor 84 arranged on a downstream side of the catalyst 82.

Figure 11:
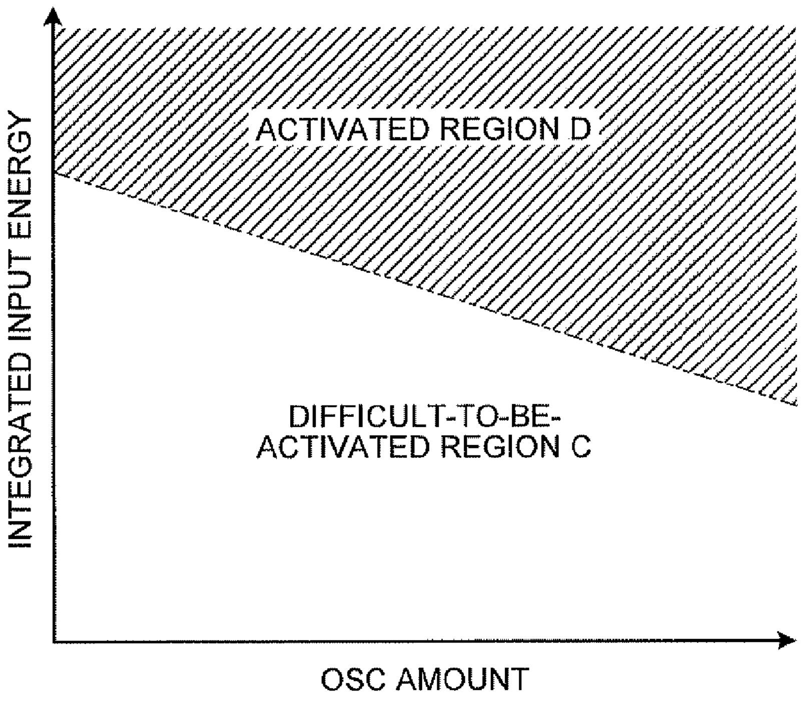
FIG. 11 is an illustrative diagram illustrating a region corresponding to integrated input energy relative to an OSC amount.

FIG. 11 is an illustrative diagram illustrating a region corresponding to the integrated input energy relative to the OSC amount. When describing the integrated input energy relative to the OSC amount, while the catalyst 82 is deteriorated as this purifies the exhaust gas, the OSC amount decreases with the deterioration of the catalyst 82 in this manner. Therefore, when the OSC amount is large, the catalyst 82 easily stores oxygen and is easily activated, and as the OSC amount decreases, the catalyst 82 has difficulty in storing oxygen and in being activated. In this manner, an activated region D, which changes according to the OSC amount, in which the catalyst 82 is easily activated increases as the OSC amount increases and decreases as the OSC amount decreases. On the other hand, a difficult-to-be-activated region C in which the catalyst 82 has difficulty in being activated decreases as the OSC amount increases and increases as the OSC amount decreases. The integrated input energy calculating unit 91 calculates the integrated input energy input to the catalyst 82 in a state of the current OSC amount by calculating the integrated input energy.

Next, it is judged whether it is in the activated region D (step ST209). This is judged by the catalyst region judging unit 92 of the drive control device 51. The catalyst region judging unit 92 judges whether the integrated input energy calculated by the integrated input energy calculating unit 91 is in the activated region D in the case of the current OSC amount. When the catalyst region judging unit 92 judges this, this is judged by checking the calculated integrated input energy and the current OSC amount against a map set in advance as relationship between the difficult-to-be-activated region C and the activated region D relative to the OSC amount and the integrated input energy to be stored in the electronic control unit 50 (refer to FIG. 11).

When it is judged that the catalyst 82 is not currently in the activated region D by the judgment by the catalyst region judging unit 92 (step ST209), the flag switching unit 58 switches on the vibration-damping control cut flag (step ST210).

When it is judged that the catalyst 82 is in the activated region D by the judgment by the catalyst region judging unit 92 (step ST209), or when the vibration-damping control cut flag is switched on by the flag switching unit 58 by the judgment that the catalyst 82 is not in the activated region D by the judgment by the catalyst region judging unit 92 (step ST209) (step ST210), the flag judging unit 62 next judges whether the vibration-damping control cut flag=off is satisfied (step ST211). When it is judged that the vibration-damping control cut flag=off is not satisfied by the judgment by the flag judging unit 62, it gets out of the processing procedure without executing the vibration-damping control.

On the other hand, when it is judged that the vibration-damping control cut flag=off is satisfied by the judgment by the flag judging unit 62 (step ST211), the correction coefficient corresponding to the current catalyst deterioration is calculated (step ST212). This is calculated by the correction coefficient calculating unit 93 of the drive control device 51. The correction coefficient calculating unit 93 calculates the correction coefficient when performing the vibration-damping control according to the current OSC amount.

Figure 12:
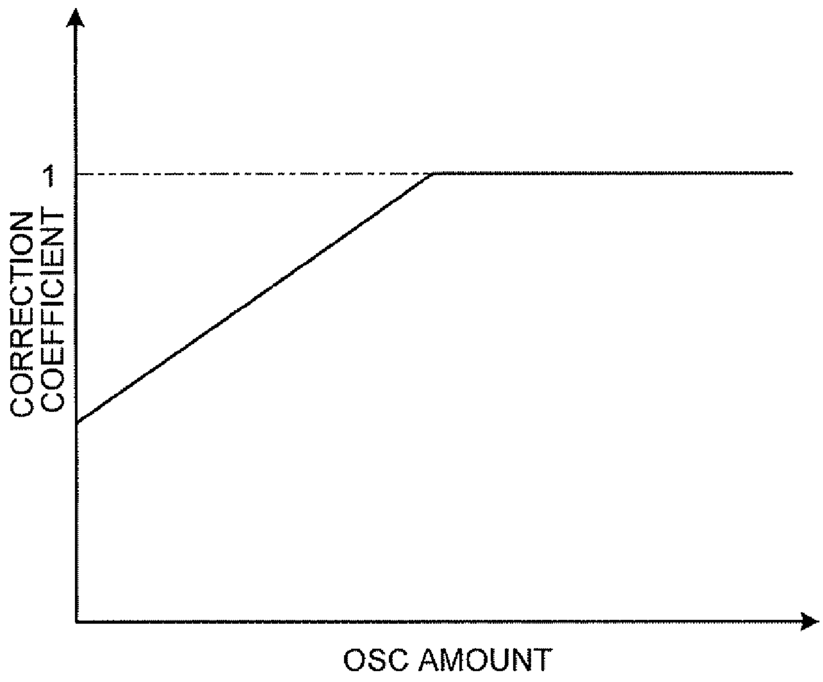
FIG. 12 is an illustrative diagram illustrating relationship between the OSC amount and a correction coefficient.

FIG. 12 is an illustrative diagram illustrating a relationship between the OSC amount and the correction coefficient. Herein, when describing the relationship between the correction coefficient and the OSC amount when performing the vibration-damping control, since the vibration-damping control is performed by adjusting the power generated by the engine 22 according to the sprung vibration, the power generated by the engine 22 tends to frequently change when executing the vibration-damping control. In this manner, when the power generated by the engine 22 changes, the amount and component of the exhaust gas also change. Although the catalyst 82 purifies the exhaust gas discharged from the engine 22 at the time of operation of the engine 22, purifying performance of the catalyst 82 changes according to the state of the deterioration of the catalyst 82.

That is to say, when the catalyst 82 is deteriorated only a little and the OSC amount is large, the performance to purify the exhaust gas of the catalyst 82 is high, and when the catalyst 82 is deteriorated and the OSC amount decreases, the performance to purify the exhaust gas of the catalyst 82 is low. Therefore, when the OSC amount is large, the exhaust gas may be effectively purified even when the amount and component of the exhaust gas change by executing the vibration-damping control, however, when the OSC amount decreases, the purification of the exhaust gas might be difficult when the amount and component of the exhaust gas change by executing the vibration-damping control.

Therefore, the vibration-damping controlling apparatus 90 according to the second embodiment is capable of purifying the exhaust gas, which easily changes at the time of the vibration-damping control, by the catalyst 82 by changing the control amount at the time of the vibration-damping control according to the OSC amount. That is to say, the vibration-damping controlling apparatus 90 according to the second embodiment sets the correction coefficient to correct the control amount at the time of the execution of the vibration-damping control and sets the correction coefficient so as to be corresponded to the OSC amount. Specifically, as illustrated in FIG. 12, when the OSC amount is a predetermined value or more, the correction coefficient is set to 1, and when the OSC amount is smaller than the predetermined amount, it is set in advance that the correction coefficient decreases as the OSC amount decreases to be stored in the electronic control unit 50 as the map. The correction coefficient calculating unit 93 calculates the correction coefficient by checking the current OSC amount against the map.

Next, the above-described calculation of the vibration-damping control is performed by the drive controlling unit 53 and the vibration-damping controlling unit 54 (step ST213). Further, the correction coefficient is multiplied by the output amount of the vibration-damping control performed by the drive controlling unit 53 and the vibration-damping controlling unit 54 to be output (step ST214). When multiplying the correction coefficient calculated by the correction coefficient calculating unit 93 by the output amount of the vibration-damping control, the correction coefficient is multiplied by the vibration-damping control compensation wheel torque. The vibration-damping control compensation wheel torque is the vibration-damping torque to be added to the driver requested torque, so that the torque for suppressing the sprung vibration out of the torque generated in the vehicle drive device 5 is corrected by multiplying the correction coefficient by the vibration-damping control compensation wheel torque to correct the vibration-damping control compensation wheel torque. In this manner, after performing the process to execute the vibration-damping control by multiplying the correction coefficient by the vibration-damping control compensation wheel torque, it gets out of the processing procedure.

The above-described vibration-damping controlling apparatus 90 makes the magnitude of the vibration-damping control compensation wheel torque to be added to the driver requested torque at the time of the vibration-damping control different according to the state of the deterioration of the catalyst 82 for purifying the exhaust gas. While the vibration-damping control suppresses the sprung vibration by adding the vibration-damping control compensation wheel torque calculated based on the sprung vibration to the driver requested torque, the oil-air ratio at the time of the vibration-damping control can be made the air-fuel ratio corresponding to the deterioration of the catalyst 82 by making the vibration-damping control compensation wheel torque different according to the state of the deterioration of the catalyst 82. According to this, it becomes possible to make the property of the exhaust gas at the time of the vibration-damping control to the property, which may be effectively purified by the catalyst 82 according to the deterioration of the catalyst 82. As a result, it is possible to achieve a good balance between the vibration-damping control and the emission performance.

Also, when judging the deterioration of the catalyst 82, this is judged based on the OSC amount and the integrated input energy, so that this may be the judged more appropriately. That is to say, the OSC amount indicates ability to store oxygen by the catalyst 82 and the integrated input energy indicates the integrated value of the energy input to the catalyst 82, that is to say, the integrated value of the exhaust gas flowing to the catalyst 82. Therefore, by judging the state of the deterioration of the catalyst based on the OSC amount and further judging the state of the catalyst 82 when the integrated input energy is input relative to the state of the deterioration of the catalyst 82, the current state of the catalyst 82 may be judged more correctly, and it is possible to judge whether the current state of the catalyst 82 is in the activated region D or in the difficult-to-be-activated region C. According to this, the state of the deterioration of the catalyst 82 can be more appropriately judged. Therefore, by judging whether to execute the vibration-damping control according to the state of the deterioration of the catalyst 82 judged in this manner, it is possible to judge whether the exhaust gas may be effectively purified when executing the vibration-damping control, and it becomes possible to judge whether to execute or inhibit the vibration-damping control according to the judgment. As a result, it becomes possible to achieve a good balance between the vibration-damping control and the emission performance.

Also, by judging the deterioration of the catalyst 82 based on the OSC amount and the integrated input energy, and by inhibiting the vibration-damping control when the current state of the catalyst 82 is in the difficult-to-be-activated region C and by executing the vibration-damping control only when the current state of the catalyst 82 is in the activated region D, the region to execute the vibration-damping control may be appropriately enlarged. That is to say, when the current state of the catalyst 82 is in the activated region D, an operational region in which the exhaust gas may be effectively purified by the catalyst 82 is large, so that the exhaust gas may be effectively purified by the catalyst 82 even when the vibration-damping control in which the property of the exhaust gas easily changes is performed when the state of the catalyst 82 is in the activated region D. Therefore, when the current state of the catalyst 82 is in the activated region D, by judging to execute the vibration-damping control, the operational region to execute the vibration-damping control may be appropriately enlarged without deteriorating the emission performance. As a result, it becomes possible to achieve a good balance between the vibration-damping control and the emission performance.

Also, when executing the vibration-damping control, the property of the exhaust gas at the time of the vibration-damping control can be made the property, which can be more certainly purified by the catalyst 82, by calculating the correction coefficient corresponding to current deterioration of the catalyst 82 and correcting the control amount of the vibration-damping control by the correction coefficient. As a result, it becomes possible to achieve a good balance between the vibration-damping control and the emission performance more certainly.

Also, by correcting the control amount of the vibration-damping control by the correction coefficient corresponding to the current deterioration of the catalyst 82 in this manner, the operational region in which the vibration-damping control can be executed can be made larger without deteriorating the emission property. As a result, it becomes possible to achieve a good balance between the vibration-damping control and the emission performance more certainly.

Third Embodiment

Figure 13:
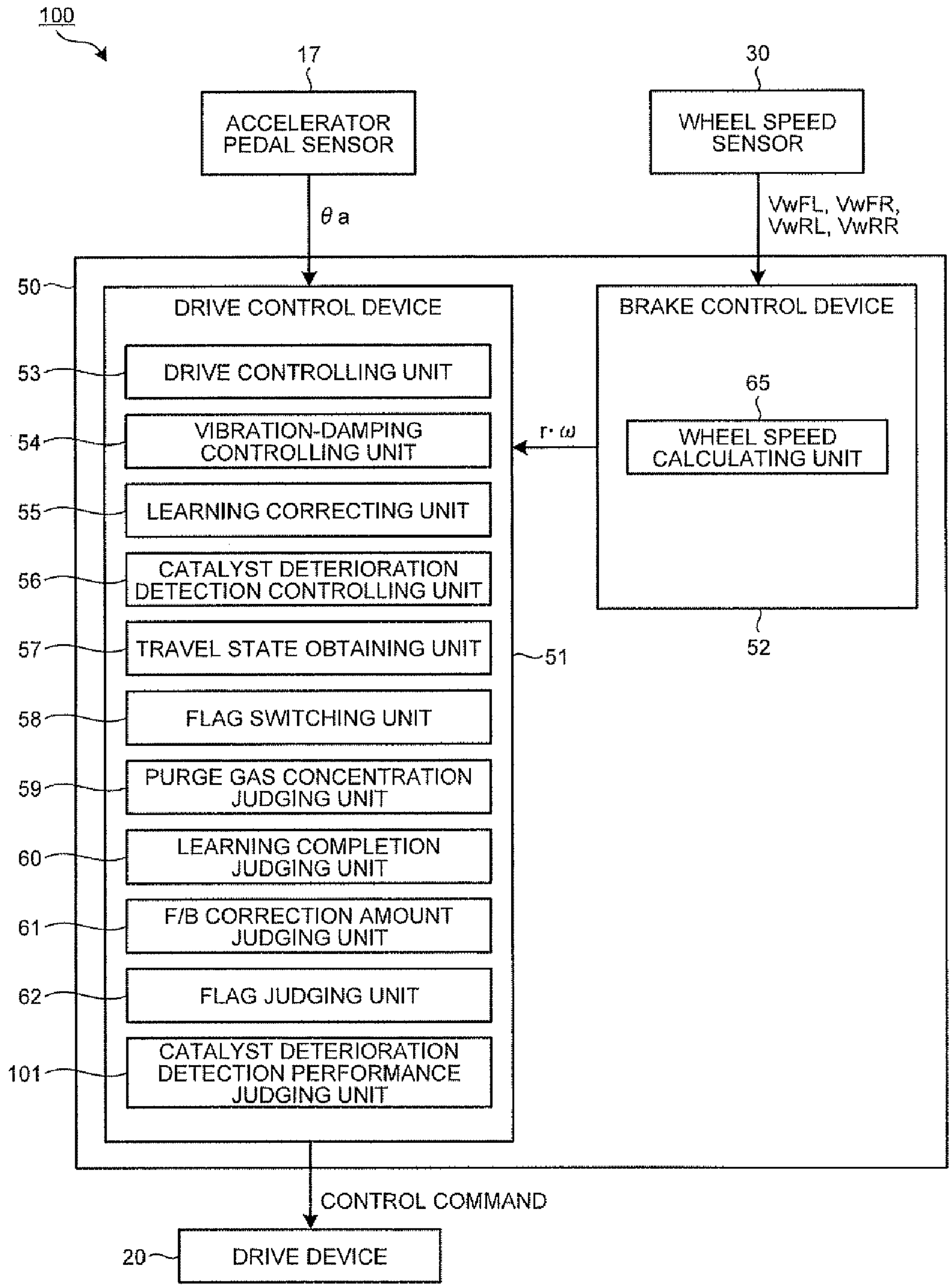
FIG. 13 is a configuration diagram of a substantial part of the vibration-damping controlling apparatus according to a third embodiment.

Although a vibration-damping controlling apparatus 100 according to a third embodiment has the configuration substantially similar to that of the vibration-damping controlling apparatus 1 according to the first embodiment, this is characterized by switching whether to execute the vibration-damping control according to an executing state of the catalyst deterioration detection control. Since the configuration other than that is similar to that of the first embodiment, the description thereof is omitted and the same reference numeral is given thereto. FIG. 13 is a configuration diagram of a substantial part of the vibration-damping controlling apparatus according to the third embodiment. The vibration-damping controlling apparatus 100 according to the third embodiment inhibits the vibration-damping control when the learning correction of the air-fuel ratio is performed as in the case of the vibration-damping controlling apparatus 1 according to the first embodiment. Further, the vibration-damping controlling apparatus 100 according to the third embodiment inhibits the vibration-damping control while the catalyst deterioration detection control is performed.

Therefore, in the vibration-damping controlling apparatus 100 according to the third embodiment, the electronic control unit 50 includes the drive control device 51 and the brake control device 52, and out of them, the drive control device 51 further includes a catalyst deterioration detection performance judging unit 101 for judging whether the catalyst deterioration detection control is performed in addition to the configuration of the drive control device 51 in the vibration-damping controlling apparatus 1 according to the first embodiment.

The vibration-damping controlling apparatus 100 according to the third embodiment has the above-described configuration and an action thereof is hereinafter described. The vibration-damping controlling apparatus 100 according to the third embodiment performs the vibration-damping control as the vibration-damping controlling apparatus 1 according to the first embodiment and the catalyst deterioration detection control is performed by the catalyst deterioration detection controlling unit 56 of the drive control device 51. Out of them, the state of the deterioration of the catalyst 82 is diagnosed by detecting the oxygen storage amount, which is the OSC amount of the catalyst 82, based on the detection results of the air-fuel ratio sensor 83 and the $O_2$ sensor 84 in the catalyst deterioration detection control, and the vibration-damping controlling apparatus 100 according to the third embodiment inhibits the vibration-damping control while the catalyst deterioration detection control is performed.

Figure 14:
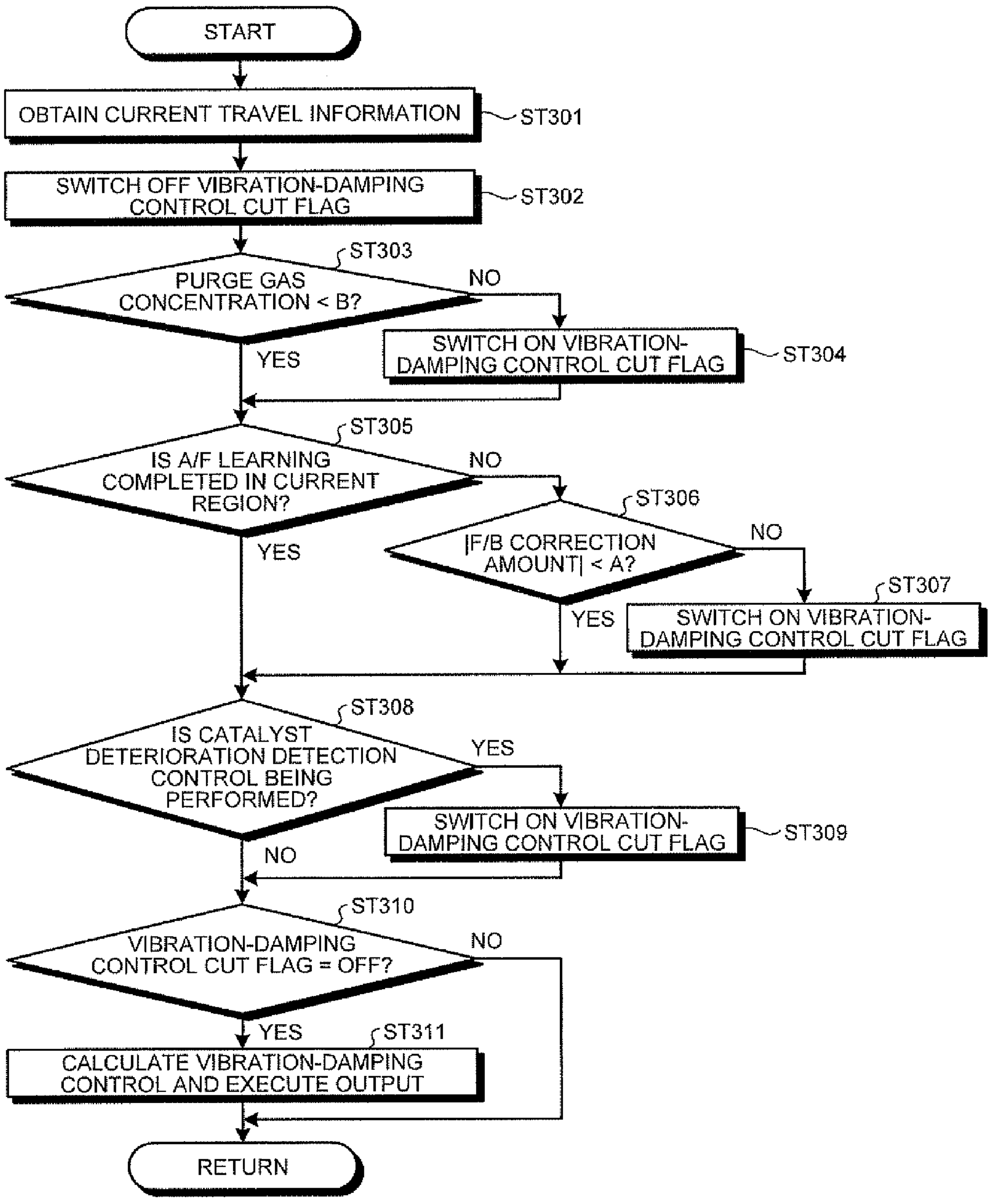
FIG. 14 is a flow diagram illustrating an overview of a processing procedure of the vibration-damping controlling apparatus according to the third embodiment.

FIG. 14 is a flow diagram illustrating an overview of the processing procedure of the vibration-damping controlling apparatus according to the third embodiment. Next, a method of controlling the vibration-damping controlling apparatus 100 according to the third embodiment, that is to say, the overview of the processing procedure of the vibration-damping controlling apparatus 100 is described. Meanwhile, a following process is the processing procedure when judging whether to inhibit the vibration-damping control, and this is called for each predetermined period to be executed when controlling each part at the time of the operation of the vehicle 10. In the processing procedure of the vibration-damping controlling apparatus 100 according to the third embodiment, the travel state obtaining unit 57 first obtains the current travel state information (step ST301). Next, the flag switching unit 58 switches off the vibration-damping control cut flag (step ST302). Next, the purge gas concentration judging unit 59 judges whether the purge gas concentration<the purge gas concentration reference value B is satisfied (step ST303).

When it is judged that the purge gas concentration<B is not satisfied by the judgment by the purge gas concentration judging unit 59 (step ST303), the flag switching unit 58 switches on the vibration-damping control cut flag (step ST304). When it is judged that the purge gas concentration<B is satisfied by the judgment by the purge gas concentration judging unit 59 (step ST303), or when the vibration-damping control cut flag is switched on by the judgment that the purge gas concentration<B is not satisfied (step ST304), the learning completion judging unit 60 next judges whether the learning correction of the air-fuel ratio is completed in the current travel region (step ST305).

When it is judged that the learning correction of the air-fuel ratio is not completed in the current travel region by the judgment by the learning completion judging unit 60 (step ST305), it is next judged whether |F/B correction amount|<the correction amount reference value A is satisfied by the F/B correction amount judging unit 61 (step ST306). When it is judged that |F/B correction amount|<A is not satisfied by the judgment by the F/B correction amount judging unit 61 (step ST306), the flag switching unit 58 switches on the vibration-damping control cut flag (step ST307).

In this manner, when the vibration-damping control cut flag is switched on by the judgment that the learning correction of the air-fuel ratio is not completed in the current travel region (step ST305) and that |F/B correction amount|<A is not satisfied (step ST306), or when it is judged that the learning correction of the air-fuel ratio is completed in the current travel region by the judgment by the learning completion judging unit 60 (step ST305), or when it is judged that |F/B correction amount|<A is satisfied by the judgment by the F/B correction amount judging unit 61 (step ST306), it is next judged whether the catalyst deterioration detection control is being performed (step ST308). This is judged by the catalyst deterioration detection performance judging unit 101 of the drive control device 51. Herein, when performing the catalyst deterioration detection control by the catalyst deterioration detection controlling unit 56, the catalyst deterioration detection control flag (not illustrated), which is the flag indicating whether the catalyst deterioration detection control is performed, is switched to a state indicating that this is being performed. Therefore, when the catalyst deterioration detection performance judging unit 101 judges whether the catalyst deterioration detection control is being performed, it is judged by referring to the catalyst deterioration detection control flag.

Meanwhile, when judging whether the catalyst deterioration detection control is being performed, it may be performed based on other than the catalyst deterioration detection control flag, for example, it may be judged by referring to the control state of the fuel injector 74 and the like by the catalyst deterioration detection controlling unit 56.

When it is judged that the catalyst deterioration detection control is performed by the judgment by the catalyst deterioration detection performance judging unit 101 (step ST308), the vibration-damping control cut flag is switched on by the flag switching unit 58 (step ST309).

When the vibration-damping control cut flag is switched on in this manner, or when it is judged that the catalyst deterioration detection control is not performed by the judgment by the catalyst deterioration detection performance judging unit 101 (step ST308), it is next judged whether the vibration-damping control cut flag=off is satisfied by the flag judging unit 62 (step ST310). When it is judged that the vibration-damping control cut flag=off is not satisfied by the judgment by the flag judging unit 62, the vibration-damping control is inhibited and it gets out of the processing procedure without executing the vibration-damping control.

On the other hand, when it is judged that the vibration-damping control cut flag=off is satisfied by the judgment by the flag judging unit 62 (step ST310), the vibration-damping control is calculated and the output is executed (step ST311). That is to say, by performing the various calculations of the above-described vibration-damping control by the drive controlling unit 53 and the vibration-damping controlling unit 54 to output the calculated results, the vibration-damping control is executed. After performing the process to execute the vibration-damping control in this manner, it gets out of the processing procedure.

The above-described vibration-damping controlling apparatus 100 switches whether to execute the vibration-damping control according to whether the deterioration of the catalyst 82 for purifying the exhaust gas is being diagnosed, so that this may diagnose the deterioration state of the catalyst 82 more certainly. That is to say, while the catalyst deterioration detection control, which is the control to diagnose the deterioration of the catalyst 82, measures the oxygen storage amount of the catalyst 82 to diagnose whether the catalyst 82 is deteriorated by setting the air-fuel ratio to an optional air-fuel ratio, the vibration-damping control changes the amount and the air-fuel ratio of the mixture gas according to the sprung vibration. Since the amount and the air-fuel ratio of the mixture gas are changed in this manner when performing the vibration-damping control, the property of the exhaust gas flowing to the catalyst 82 changes, however, when the property of the exhaust gas flowing to the catalyst 82 changes according to the sprung vibration, there is a case in which the oxygen storage amount of the catalyst 82 measured by the catalyst deterioration detection control cannot be measured correctly. Therefore, the vibration-damping controlling apparatus 100 according to the third embodiment inhibits the vibration-damping control while the catalyst deterioration detection control is performed.

According to this, it becomes more certainly possible to set the air-fuel ratio of the mixture gas to the optional air-fuel ratio capable of measuring the oxygen storage amount of the catalyst 82 at the time of the catalyst deterioration detection control, so that the oxygen storage amount of the catalyst 82 can be more correctly measured when diagnosing the deterioration state of the catalyst 82. Therefore, it becomes possible to more correctly diagnose the deterioration state of the catalyst 82, so that it becomes possible to control according to the deterioration state of the catalyst 82 when performing the operation control of the engine 22. As a result, it is possible to achieve a good balance between the vibration-damping control and the emission performance.

Meanwhile, when it is judged that the purge gas concentration is the purge gas concentration reference value B or more in the control by the vibration-damping controlling apparatuses 1, 90 and 100 according to the first to third embodiments, respectively (steps ST103, ST203 and ST303), when it is judged that the absolute value of the F/B correction amount is smaller than the correction amount reference value A when it is judged that the learning correction of the air-fuel ratio is not completed (steps ST105, ST205 and ST305) (steps ST106, ST206 and ST306), when it is judged that the catalyst 82 is not in the activated region D in the control by the vibration-damping controlling apparatus 90 according to the second embodiment (step ST209), and when it is judged that the catalyst deterioration detection control is performed in the control by the vibration-damping controlling apparatus 100 according to the third embodiment (step ST308), the vibration-damping control is inhibited by setting the gain of the vibration-damping control compensation wheel torque to 0, however, it is not required to inhibit the vibration-damping control in these cases.

For example, in these cases, the vibration-damping control compensation wheel torque to be added to the driver requested torque may be made smaller by setting the gain of the vibration-damping control compensation wheel torque to be smaller than that when it is not judged in this manner without inhibiting the vibration-damping control. In this manner, when it is judged as above, that is to say, when it is judged to be in the operational state affecting to the purification of the exhaust gas by the catalyst 82, the change in the property of the exhaust gas due to the performance of the vibration-damping control can be inhibited by making the vibration-damping control compensation wheel torque smaller and making the control amount of the vibration-damping control smaller. According to this, the exhaust gas can be effectively purified by the catalyst 82. As a result, it is possible to achieve a good balance between the vibration-damping control and the emission performance.

Although the correction coefficient to correct the control amount when executing the vibration-damping control is calculated based on the OSC amount by the vibration-damping controlling apparatus 90 according to the second embodiment, the correction coefficient may be calculated based on other than the OSC amount. For example, as in the case in which the correction coefficient is calculated based on the OSC amount, the correction coefficient for a temperature of the catalyst 82 is set in advance to be stored in the electronic control unit 50 as the map, and when calculating the correction coefficient, the correction coefficient is calculated by checking a current temperature of the catalyst 82 against the map. Meanwhile, the temperature of the catalyst 82 may be detected by a temperature sensor (not illustrated) provided on the catalyst 82, or it is possible to estimate a flow amount and a temperature of the exhaust gas flowing to the catalyst 82 by the operational state of the engine 22 to estimate the temperature of the catalyst 82 based on the temperature and the like of the exhaust gas.

Also, the correction coefficient set for the temperature of the catalyst 82 is set to 1 when the temperature of the catalyst 82 is a predetermined temperature or less and set to decrease as the temperature of the catalyst 82 increases when the temperature of the catalyst 82 is higher than the predetermined temperature. When performing the vibration-damping control, the correction coefficient is calculated based on the temperature of the catalyst 82 in this manner and the calculated correction coefficient is multiplied by the vibration-damping control compensation wheel torque, thereby executing the vibration-damping control. The correction coefficient is set to decrease as the temperature increases when the temperature of the catalyst 82 is higher than the predetermined temperature, so that the vibration-damping control compensation wheel torque by which the correction coefficient is multiplied also decreases as the temperature increases when the temperature of the catalyst 82 is higher than the predetermined temperature.

Although the catalyst 82 is easily deteriorated when the temperature is too high, by making the magnitude of the vibration-damping control compensation wheel torque different according to the temperature of the catalyst 82 and making the vibration-damping control compensation wheel torque smaller as the temperature of the catalyst 82 increases in this manner, variation in the property of the exhaust gas at the time of the vibration-damping control may be made small. According to this, the property of the exhaust gas at the time of the vibration-damping control can be made that can be more certainly purified by the catalyst 82. As a result, it becomes possible to achieve a good balance between the vibration-damping control and the emission performance more certainly.

Although the electronic control unit 50 includes the drive control device 51 and the brake control device 52 and the drive control device 51 is further provided with the drive controlling unit 53 and the like in the vibration-damping controlling apparatuses 1, 90 and 100 according to the first to third embodiments, respectively, the configuration of the electronic control unit 50 may be different from this. The electronic control unit 50 may be provided with each function for performing the above-described control and may have the configuration other than that of the electronic control unit 50 of the vibration-damping controlling apparatuses 1, 90 and 100 according to the first to third embodiments, respectively if this is provided with each such function. Since the electronic control unit 50 has each such function, the state of the vibration-damping control can be switched according to whether the current operational state is the state capable of effectively purifying the exhaust gas by the catalyst 82, thereby achieving a good balance between the vibration-damping control and the emission performance.

Although the case in which the driving torque generated by the vehicle drive device 5 is controlled based on the driver requested torque, which is the drive request of the driver, is described in the vibration-damping controlling apparatuses 1, 90 and 100 according to the first to third embodiments, respectively, the present invention is not limited to this. For example, the vehicle 10 may be provided with an automatic travel control device to perform power control based on the requested torque calculated when controlling each unit of the vehicle drive device 5 in automatic travel control.

INDUSTRIAL APPLICABILITY

As described above, the vibration-damping controlling apparatus according to the present invention is useful when reducing the vibration occurring in the vehicle body, and especially suitable for the vibration-damping controlling apparatus for reducing the vibration by controlling the driving force at the time of the vehicle travel.

REFERENCE SIGNS LIST

1, 90, 100 VIBRATION-DAMPING CONTROLLING APPARATUS
5 VEHICLE DRIVE DEVICE
10 VEHICLE
11 VEHICLE BODY
12 WHEEL
16 ACCELERATOR PEDAL
20 DRIVE DEVICE
22 ENGINE
26 AUTOMATIC TRANSMISSION
30 WHEEL SPEED SENSOR
50 ELECTRONIC CONTROL UNIT
51 DRIVE CONTROL DEVICE
52 BRAKE CONTROL DEVICE
53 DRIVE CONTROLLING UNIT
54 VIBRATION-DAMPING CONTROLLING UNIT
55 LEARNING CORRECTING UNIT
56 CATALYST DETERIORATION DETECTION CONTROLLING UNIT
57 TRAVEL STATE OBTAINING UNIT
58 FLAG SWITCHING UNIT
59 PURGE GAS CONCENTRATION JUDGING UNIT
60 LEARNING COMPLETION JUDGING UNIT
61 F/B CORRECTION AMOUNT JUDGING UNIT
62 FLAG JUDGING UNIT
65 WHEEL SPEED CALCULATING UNIT
70 COMBUSTION CHAMBER
71 INTAKE PASSAGE
72 EXHAUST PASSAGE
73 THROTTLE VALVE
74 FUEL INJECTOR
80 PURGE PASSAGE
81 PURGE CONTROL VALVE
82 CATALYST
83 AIR-FUEL RATIO SENSOR
84 $O_2$ SENSOR
91 INTEGRATED INPUT ENERGY CALCULATING UNIT
92 CATALYST REGION JUDGING UNIT
93 CORRECTION COEFFICIENT CALCULATING UNIT
101 CATALYST DETERIORATION DETECTION PERFORMANCE JUDGING UNIT

The invention claimed is:

1. A vibration-damping controlling apparatus that suppresses a sprung vibration occurring in a vehicle by controlling torque generated in a wheel of the vehicle, comprising:

a vibration-damping controlling unit that calculates a correction amount of a driving torque for suppressing the sprung vibration when performing a vibration-damping control; and a learning correcting unit that performs a learning correction of an air-fuel ratio when adjusting the air-fuel ratio of a mixture gas at a time of operation of an engine, wherein when the learning correction of the air-fuel ratio is not completed by the learning correcting unit and when a learning of the air-fuel ratio at the time of the operation of the engine is performed, the vibration-damping controlling unit makes a magnitude of a vibration-damping torque, being a torque for vibration damping capable of suppressing the sprung vibration, different from the magnitude of the vibration-damping torque when the learning of the air-fuel ratio is not performed.

2. A vibration-damping controlling apparatus that suppresses a sprung vibration occurring in a vehicle by controlling torque generated in a wheel of the vehicle, comprising:

a vibration-damping controlling unit that calculates a correction amount of driving torque for suppressing the sprung vibration when performing a vibration-damping control; and a catalyst deterioration detection controlling unit that performs a catalyst deterioration detection control, which is a control to estimate a deterioration state of a catalyst, wherein the vibration-damping controlling unit makes a magnitude of a vibration-damping torque, being a torque for vibration damping capable of suppressing the sprung vibration, different according to the deterioration state of the catalyst, estimated by the catalyst deterioration detection controlling unit, for purifying exhaust gas discharged from an engine as a power source of the vehicle.

3. The vibration-damping controlling apparatus according to claim 2, wherein the magnitude of the vibration-damping torque is made different according to a temperature of the catalyst.

4. A vibration-damping controlling apparatus that suppresses a sprung vibration occurring in a vehicle by controlling torque generated in a wheel of the vehicle, comprising:

a vibration-damping controlling unit that calculates a correction amount of driving torque for suppressing the sprung vibration when performing a vibration-damping control; and a catalyst deterioration detection performance judging unit that judges whether a catalyst deterioration detection control is performed, wherein the vibration-damping controlling unit makes a magnitude of a vibration-damping torque, being a torque for vibration damping capable of suppressing the sprung vibration, different according to whether deterioration of a catalyst for purifying exhaust gas discharged from an engine as a power source of the vehicle is being diagnosed by the catalyst deterioration detection performance judging unit.

* * * * *